(12) United States Patent
Nagao

(10) Patent No.: US 10,097,347 B2
(45) Date of Patent: Oct. 9, 2018

(54) CONTENT PROVIDING SYSTEM, CONTENT REPRODUCING DEVICE, CONTENT REPRODUCING METHOD, AND COMPUTER PROGRAM

(75) Inventor: Yutaka Nagao, Chiba (JP)

(73) Assignee: Sony Corporation, Tokyo (JP)

(*) Notice: Subject to any disclaimer, the term of this patent is extended or adjusted under 35 U.S.C. 154(b) by 1374 days.

(21) Appl. No.: 11/392,729

(22) Filed: Mar. 30, 2006

(65) Prior Publication Data
US 2007/0198413 A1 Aug. 23, 2007

(30) Foreign Application Priority Data

Apr. 7, 2005 (JP) ................................. 2005-111279

(51) Int. Cl.
*H04L 9/08* (2006.01)
*H04L 29/06* (2006.01)
(52) U.S. Cl.
CPC .......... *H04L 9/0822* (2013.01); *H04L 9/0894* (2013.01); *H04L 63/0428* (2013.01); *H04L 2209/56* (2013.01); *H04L 2209/603* (2013.01); *H04L 2463/101* (2013.01)
(58) Field of Classification Search
USPC ........................................ 705/50, 51, 54, 26
See application file for complete search history.

(56) References Cited

U.S. PATENT DOCUMENTS 5,029,207 A * 7/1991 Gammie ....................... 380/228
5,889,942 A * 3/1999 Orenshteyn ...................... 726/3
6,006,190 A * 12/1999 Baena-Arnaiz et al. ......... 705/1
6,144,743 A * 11/2000 Yamada et al. ................ 380/44
6,389,538 B1 * 5/2002 Gruse et al. .................. 713/194

(Continued)

FOREIGN PATENT DOCUMENTS

JP 2001-078266 3/2001
JP 2002-359616 12/2002

(Continued)

OTHER PUBLICATIONS

Office Action from the Japanese Patent Office, dated Feb. 16, 2011, in Japanese Patent Application No. JP-2005-111279.

(Continued)

*Primary Examiner* — Mamon Obeid
(74) *Attorney, Agent, or Firm* — Xsensus, LLP

(57) ABSTRACT

A content reproducing device decrypts and outputs an encrypted content encrypted by a content key received from a content transmitting device. The content reproducing device includes a content key obtaining unit for obtaining the content key, and a storage unit for storing the key unique to the content transmitting device, usage restriction information to restrict the usage of the key unique to the content transmitting device, and link information indicating linking of the content transmitting device and the content reproducing device. The content reproducing device also includes a key decryption unit for decrypting the content key with the key unique to the content transmitting device in the event that the content reproducing device is included in the stored link information unit, and a usage control unit for restricting usage of the key unique to the content transmitting device, based on the stored usage restriction information.

14 Claims, 23 Drawing Sheets

(56) References Cited

U.S. PATENT DOCUMENTS

| | | | |
|---|---|---|---|
| 6,393,569 B1* | 5/2002 | Orenshteyn | 726/4 |
| 6,418,421 B1* | 7/2002 | Hurtado et al. | 705/54 |
| 6,484,182 B1* | 11/2002 | Dunphy | G06F 17/30958 |
| | | | 700/231 |
| 6,505,160 B1* | 1/2003 | Levy et al. | 704/270 |
| 6,560,651 B2* | 5/2003 | Katz et al. | 709/229 |
| 6,587,837 B1* | 7/2003 | Spagna et al. | 705/26 |
| 6,611,812 B2* | 8/2003 | Hurtado et al. | 705/26 |
| 6,772,340 B1* | 8/2004 | Peinado et al. | 713/168 |
| 6,792,113 B1* | 9/2004 | Ansell | G06F 21/10 |
| | | | 380/284 |
| 6,891,953 B1* | 5/2005 | DeMello et al. | 380/277 |
| 6,898,708 B2* | 5/2005 | Hori et al. | 713/171 |
| 6,920,436 B2* | 7/2005 | Stefik et al. | 705/51 |
| 6,961,858 B2* | 11/2005 | Fransdonk | G06F 21/10 |
| | | | 380/281 |
| 6,973,499 B1* | 12/2005 | Peden et al. | 709/229 |
| 7,010,809 B2* | 3/2006 | Hori et al. | 726/26 |
| 7,020,635 B2* | 3/2006 | Hamilton | G06Q 20/00 |
| | | | 705/51 |
| 7,058,819 B2* | 6/2006 | Okaue | G11B 20/00086 |
| | | | 380/201 |
| RE39,166 E * | 7/2006 | Gammie | 380/228 |
| 7,080,049 B2* | 7/2006 | Truitt | G06Q 20/16 |
| | | | 380/30 |
| 7,090,128 B2* | 8/2006 | Farley | H04L 67/2823 |
| | | | 235/384 |
| 7,107,462 B2* | 9/2006 | Fransdonk | G06Q 20/12 |
| | | | 380/282 |
| 7,150,045 B2* | 12/2006 | Koelle | G06F 21/552 |
| | | | 726/26 |
| 7,178,021 B1* | 2/2007 | Hanna et al. | 713/155 |
| 7,181,629 B1* | 2/2007 | Hatanaka et al. | 713/194 |
| 7,191,346 B2* | 3/2007 | Abe et al. | 713/194 |
| 7,243,242 B2* | 7/2007 | Moriai | 713/300 |
| 7,249,107 B2* | 7/2007 | Yaacovi | 705/59 |
| 7,260,721 B2* | 8/2007 | Tanaka et al. | 713/170 |
| 7,353,541 B1* | 4/2008 | Ishibashi | G06F 21/10 |
| | | | 348/E7.056 |
| 7,376,626 B2* | 5/2008 | Nagai | G11B 20/00086 |
| | | | 705/51 |
| 7,424,613 B2* | 9/2008 | Han et al. | 713/168 |
| 7,487,363 B2* | 2/2009 | Alve et al. | 713/193 |
| 7,502,754 B2* | 3/2009 | Campbell et al. | 705/35 |
| 7,587,051 B2* | 9/2009 | Bisson et al. | 380/281 |
| 7,587,502 B2* | 9/2009 | Crawford | A63F 13/12 |
| | | | 463/42 |
| 7,711,586 B2* | 5/2010 | Aggarwal | G06Q 10/02 |
| | | | 700/14 |
| 7,765,604 B2* | 7/2010 | Tanaka | G06F 21/10 |
| | | | 380/232 |
| 7,886,038 B2* | 2/2011 | Ferris | 709/223 |
| 8,073,442 B2* | 12/2011 | Frank et al. | 726/27 |
| 8,180,936 B2* | 5/2012 | Jeong et al. | 710/33 |
| 8,713,147 B2* | 4/2014 | Ferris et al. | 709/223 |
| 8,752,190 B2* | 6/2014 | Kamperman | 726/27 |
| 8,769,083 B2* | 7/2014 | Ferris et al. | 709/224 |
| 8,984,505 B2* | 3/2015 | Ferris | 718/1 |
| 9,009,805 B1* | 4/2015 | Kirkby | G06K 9/00711 |
| | | | 726/7 |
| 9,614,845 B2* | 4/2017 | Rolfe | H04L 63/0876 |
| 9,807,069 B2* | 10/2017 | Maher | H04L 63/08 |
| 2001/0036164 A1* | 11/2001 | Kakemizu et al. | 370/331 |
| 2002/0013772 A1* | 1/2002 | Peinado | 705/51 |
| 2002/0066033 A1* | 5/2002 | Dobbins et al. | 713/201 |
| 2002/0076204 A1* | 6/2002 | Nakano et al. | 386/94 |
| 2002/0108055 A1* | 8/2002 | Okaue | G11B 20/00086 |
| | | | 726/26 |
| 2002/0114466 A1* | 8/2002 | Tanaka et al. | 380/232 |
| 2002/0154779 A1* | 10/2002 | Asano et al. | 380/277 |
| 2002/0157002 A1* | 10/2002 | Messerges et al. | 713/155 |
| 2002/0165912 A1* | 11/2002 | Wenocur et al. | 709/203 |
| 2002/0169878 A1* | 11/2002 | Orenshteyn | 709/227 |
| 2002/0174354 A1* | 11/2002 | Bel et al. | 713/193 |
| 2002/0178360 A1* | 11/2002 | Wenocur et al. | 713/170 |
| 2002/0184398 A1* | 12/2002 | Orenshteyn | 709/310 |
| 2002/0186844 A1* | 12/2002 | Levy et al. | 380/231 |
| 2002/0194010 A1* | 12/2002 | Bergler et al. | 705/1 |
| 2002/0194483 A1* | 12/2002 | Wenocur et al. | 713/185 |
| 2002/0194501 A1* | 12/2002 | Wenocur et al. | 713/201 |
| 2002/0196935 A1* | 12/2002 | Wenocur et al. | 380/37 |
| 2002/0199001 A1* | 12/2002 | Wenocur et al. | 709/227 |
| 2002/0199096 A1* | 12/2002 | Wenocur et al. | 713/153 |
| 2003/0009694 A1* | 1/2003 | Wenocur et al. | 713/201 |
| 2003/0041110 A1* | 2/2003 | Wenocur et al. | 709/206 |
| 2003/0076955 A1* | 4/2003 | Alve | G06F 21/10 |
| | | | 380/201 |
| 2003/0079042 A1* | 4/2003 | Yamanaka | H04L 29/06 |
| | | | 709/247 |
| 2003/0105956 A1* | 6/2003 | Ishiguro | G06F 21/10 |
| | | | 713/158 |
| 2003/0159033 A1* | 8/2003 | Ishiguro | 713/156 |
| 2003/0187801 A1* | 10/2003 | Chase et al. | 705/59 |
| 2003/0236756 A1* | 12/2003 | Humpleman et al. | 705/76 |
| 2003/0236820 A1* | 12/2003 | Tierney et al. | 709/203 |
| 2004/0059937 A1* | 3/2004 | Nakano | G06F 21/10 |
| | | | 726/28 |
| 2004/0078338 A1* | 4/2004 | Ohta | G06F 21/10 |
| | | | 705/51 |
| 2004/0088541 A1* | 5/2004 | Messerges et al. | 713/156 |
| 2004/0093523 A1* | 5/2004 | Matsuzaki et al. | 713/201 |
| 2004/0139022 A1* | 7/2004 | Singer et al. | 705/50 |
| 2004/0165729 A1* | 8/2004 | Bisson et al. | 380/281 |
| 2004/0172556 A1* | 9/2004 | Nagao | G06F 21/10 |
| | | | 726/24 |
| 2004/0186853 A1* | 9/2004 | Yamamoto et al. | 707/104.1 |
| 2004/0236697 A1* | 11/2004 | Nagao | G06F 21/10 |
| | | | 705/59 |
| 2004/0243634 A1* | 12/2004 | Levy | G06F 21/10 |
| 2005/0005141 A1* | 1/2005 | Nagai | G11B 20/00086 |
| | | | 713/193 |
| 2005/0022227 A1* | 1/2005 | Shen et al. | 725/28 |
| 2005/0086298 A1* | 4/2005 | Campbell et al. | 709/203 |
| 2005/0086514 A1* | 4/2005 | Han | H04L 63/0823 |
| | | | 726/26 |
| 2005/0182727 A1* | 8/2005 | Robert et al. | 705/51 |
| 2005/0204037 A1* | 9/2005 | Levy | 709/225 |
| 2005/0216413 A1* | 9/2005 | Murakami et al. | 705/51 |
| 2006/0074985 A1* | 4/2006 | Wolfish et al. | 707/104.1 |
| 2006/0165233 A1* | 7/2006 | Nonaka et al. | 380/44 |
| 2006/0177066 A1* | 8/2006 | Han et al. | 380/277 |
| 2006/0235956 A1* | 10/2006 | Kawaguchi | G06F 21/10 |
| | | | 709/223 |
| 2007/0150299 A1* | 6/2007 | Flory | G06Q 10/10 |
| | | | 705/51 |
| 2007/0198413 A1* | 8/2007 | Nagao | H04L 63/0428 |
| | | | 705/50 |
| 2007/0265973 A1* | 11/2007 | Kahn | G06F 21/10 |
| | | | 705/57 |
| 2008/0085002 A1* | 4/2008 | Ques et al. | 380/255 |
| 2008/0243698 A1* | 10/2008 | Tanaka | 705/57 |
| 2009/0043412 A1* | 2/2009 | Ben-Yaacov et al. | 700/94 |
| 2009/0138577 A1* | 5/2009 | Casado et al. | 709/220 |
| 2010/0185865 A1* | 7/2010 | Yeap | G06F 21/43 |
| | | | 713/176 |
| 2010/0281262 A1* | 11/2010 | Cheng | G06F 21/10 |
| | | | 713/171 |
| 2012/0201376 A1* | 8/2012 | Kambayashi | H04L 9/0822 |
| | | | 380/44 |
| 2013/0179695 A1* | 7/2013 | Zollinger | H04L 9/3271 |
| | | | 713/189 |
| 2013/0212659 A1* | 8/2013 | Maher | H04L 63/06 |
| | | | 726/6 |
| 2014/0282974 A1* | 9/2014 | Maher | H04L 63/08 |
| | | | 726/7 |
| 2014/0283010 A1* | 9/2014 | Rutkowski | G06F 21/31 |
| | | | 726/18 |
| 2015/0067548 A1* | 3/2015 | Mutyala | G06F 3/0488 |
| | | | 715/761 |

(56) References Cited

U.S. PATENT DOCUMENTS

| | | | | |
|---|---|---|---|---|
| 2016/0057112 A1* | 2/2016 | Ueda | ............ | H04L 63/0428 |
| | | | | 713/168 |
| 2016/0286378 A1* | 9/2016 | Salmela | ............ | H04L 29/06 |
| 2016/0308862 A1* | 10/2016 | Rolfe | ............ | H04L 63/0876 |
| 2017/0352079 A1* | 12/2017 | Nagao | ............ | G06Q 30/0605 |
| 2018/0063113 A1* | 3/2018 | Maher | ............ | H04L 9/3271 |
| 2018/0096599 A1* | 4/2018 | Nagao | ............ | G08G 1/123 |

FOREIGN PATENT DOCUMENTS

| | | |
|---|---|---|
| JP | 2004-227283 | 8/2004 |
| JP | 2005-056234 | 3/2005 |

OTHER PUBLICATIONS

English-language Translation of JP 2001-078266.
English-language Translation of JP 2004-227283.
English-language Translation of JP 2005-056234.

* cited by examiner

FIG. 6

| USER ID 3121 | CREDIT CARD NO. 3122 | USER KEY 3123 | DEVICE ID 3124 | DEVICE KEY 3125 | LINK 3126 |
|---|---|---|---|---|---|
| Yamada Taro | xxx - xxxx | USER KEY A | DEVICE ID 1 | DEVICE KEY 1 | LINK A |
| | | | DEVICE ID 2 | DEVICE KEY 2 | LINK B, LINK C |
| | | | DEVICE ID 3 | DEVICE KEY 3 | LINK D |
| Suzuki Jiro | xxx - xxxx | USER KEY B | DEVICE ID 4 | DEVICE KEY 4 | LINK E |
| | | | DEVICE ID 5 | DEVICE KEY 5 | LINK F |
| | | | DEVICE ID 6 | DEVICE KEY 6 | LINK G |
| | | | DEVICE ID 7 | DEVICE KEY 7 | LINK H |
| ... | ... | ... | ... | ... | ... |

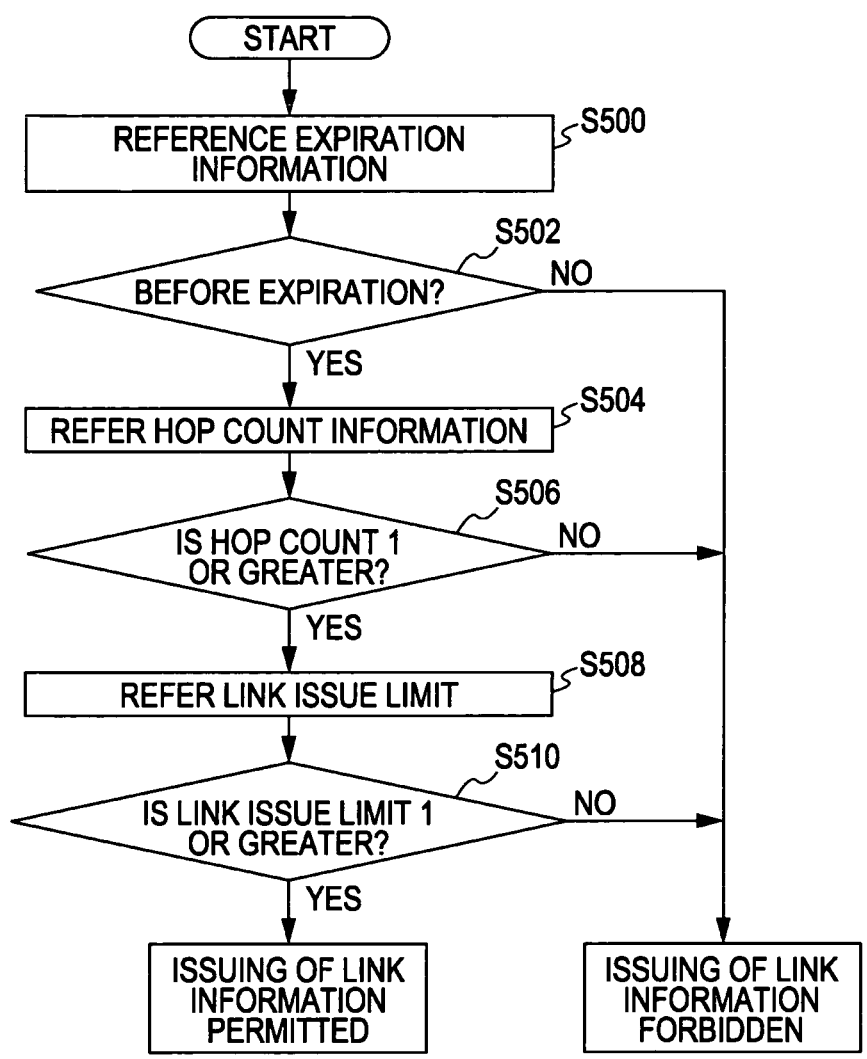

US 10,097,347 B2

CONTENT PROVIDING SYSTEM, CONTENT REPRODUCING DEVICE, CONTENT REPRODUCING METHOD, AND COMPUTER PROGRAM

CROSS REFERENCES TO RELATED APPLICATIONS

The present invention contains subject matter related to Japanese Patent Application JP 2005-111279 filed in the Japanese Patent Office on Apr. 7, 2005, the entire contents of which are incorporated herein by reference.

BACKGROUND OF THE INVENTION

1. Field of the Invention

The present invention relates to a content providing system, and particularly relates to a system for providing a content key to a content reproducing device which decrypts content encrypted with the content key and reproduces the content.

2. Description of the Related Art

In recent years there has been an increase in unauthorized distribution and sharing of digital content such as music content and so forth, without permission of the copyright holder, as the Internet has become more commonplace and the speed and capacity of PCs (personal computers) has increased. Accordingly, copyright-protection technology for restricting distribution and usage of contents is spreading, to prevent such unauthorized acts.

For example, Japanese Unexamined Patent Application Publication No. 2002-359616 discloses copyright-protection technology wherein a license necessary for permitting usage of contents is provided to a device owned by a user, thereby restricting reproduction of contents, enabling sharing of contents, and so forth. This copyright-protection technology enables a user who has purchased the contents to share the contents among equipment owned by the user with a certain degree of freedom, while protecting the copyright of the contents. This also involves setting an expiration date on usage of the contents, the number of times that copying is permitted, the number of times that check-out is permitted, or the like, thereby establishing usage conditions of the contents corresponding to the license.

SUMMARY OF THE INVENTION

However, a content providing system using the copyright-protection technology described in the above Publication is not capable of setting usage conditions of multiple contents for each device which uses the contents.

Accordingly, there is a need for a content providing system, a content reproducing device, a content reproducing method, and a computer program, whereby usage conditions of multiple contents can be set for each device which uses the contents. The present invention has been made in light of the above.

To this end, a content providing system according to an embodiment of the present invention is provided including two or more content reproducing devices for decrypting and outputting an encrypted content encrypted by a content key. With this system, a content transmitting device which is a content providing device for providing the content to the content reproducing devices has a device key encrypting unit configured to encrypt a device key unique to the content transmitting device with a device key unique to the content reproducing device, and a link information issuing unit configured to provide the content reproducing device with one or a plurality of sets of link information for generating a path of which the origin is the content transmitting device and of which the destination is the content reproducing device, the device key unique to the content transmitting device encrypted at the device key encrypting unit, a content key encrypted with the device key unique to the content transmitting device, and content usage restriction information. The content reproducing device which is provided with the content has a content key obtaining unit configured to obtain the content key encrypted with a key unique to the content transmitting device; a storage unit configured to store the key unique to the content transmitting device, usage restriction information to restrict the usage of the key unique to the content transmitting device, and link information indicating linking of the content transmitting device and the content reproducing device; a key decryption unit configured to decrypt the content key with the key unique to the content transmitting device in the event that the content reproducing device is included in the link information stored at the storage unit; and a usage control unit configured to restrict usage of the key unique to the content transmitting device, based on the usage restriction information stored in the storage unit.

According to this arrangement, the content reproducing device obtains a device key unique to the content transmitting device, which is a content providing source providing content to the content reproducing device, from the content transmitting device, and also obtains usage restriction information of the device key. Also, the content reproducing device obtains a content key encrypted with the device key unique to the content transmitting device. The content reproducing device then decrypts the content key using the obtained device key, and thus can decrypt and play the content corresponding to the content key. However, the content reproducing device is restricted in use of the device key, based on the usage restriction information. Accordingly, reproduction of the content at the content reproducing device which receives the content can be restricted by the content providing device providing the content reproducing device with usage restriction information along with the device key.

Also to this end, provided according to an embodiment of the present invention is a content reproducing device for decrypting and reproducing an encrypted content encrypted with a content key. The content reproducing device includes a content key obtaining unit configured to obtain the content key encrypted with a key unique to the content transmitting device; a storage unit configured to store the key unique to the content transmitting device, usage restriction information to restrict the usage of the key unique to the content transmitting device, and link information indicating linking of the content transmitting device and the content reproducing device; a key decryption unit configured to decrypt the content key with the key unique to the content transmitting device in the event that the content reproducing device is included in the link information stored at the storage unit; and a usage control unit configured to restrict usage of the key unique to the content transmitting device, based on the usage restriction information stored in the storage unit.

The content transmitting device, which is the content providing source, is an individual or a computer which has validly been provided with the content. Specifically, this is a user who has been issued a license from a copyright management server, or the computer which that user uses. Accordingly, the key unique to the content transmitting device is a user key unique to the user who has been issued a license from a copyright management server, or a device key unique to the computer which that user uses.

The term "encryption" means to reassemble digital information using an encryption key. Content keys, user keys, and device keys are all encryption keys. An encryption key is a predetermined rule used for reassembling the digital information. Examples of encryption methods include public key encryption wherein different keys are used for encryption and decryption, and secret key encryption wherein the same key is used for encryption and decryption, and the present invention is applicable to both methods. Note that in the present specification, both a key for encrypting the content and a key for decrypting the content will be referred to as a "content key". Also, a user key is a key provided to a user which uses the content providing system, and includes both a key for encryption and a key for decryption. A device key is a key provided to a content reproducing device, and includes both a key for encryption and a key for decryption.

According to this arrangement, the content reproducing device obtains a key unique to the content transmitting device (the above-described user key or device key) and usage restriction information of the key. Also, the content reproducing device obtains a content key encrypted with the key unique to the content transmitting device. The content reproducing device can decrypt and reproduce the content corresponding to the content key by decrypting the content key with the obtained key. At this time, the content reproducing device restricts usage of the device key based on the usage restriction information. That is to say, the content reproducing device decrypts all of the content keys encrypted with the key unique to the content transmitting device, and can reproduce the contents corresponding to each of the content keys, but on the other hand is restricted regarding use of all of the contents which can be reproduced using the keys, since usage of the keys is restricted by the usage restriction information.

The key unique to the content transmitting device stored in the link information storage unit may be encrypted, and in this case, the content reproducing device may be provided with a key processing unit for decrypting the key unique to the content transmitting device using the device key unique to itself, which is successful in decryption of the key in the event that link information, in which identification information identifying the itself and identification information identifying the content transmitting device have been correlated, has been stored in the link information storage unit. According to this arrangement, the key unique to the content transmitting device is encrypted, so even in the event that the key leaks out to an external computer the key is encrypted, so decrypting of the encrypted content key using the unique key of the content transmitting device by the computer can be prevented. Also, at this content reproducing device as well, decryption of the key unique to the content transmitting device is successful only in the event that link information, in which identification information identifying itself and identification information identifying the content transmitting device have been correlated, has been stored in the link information storage unit. Accordingly, once this correlation is deleted from the link information storage unit, the content reproduction device can no longer use the key unique to the content transmitting device. Accordingly, use of the key by the content reproducing device can be prevented even without changing the key unique to the content transmitting device.

The link information storage unit may store at least one set of link information, with correlation of the content reproducing device and the content transmitting device being realized by a path being generated, in which the origin is the content reproducing device and the destination is the content transmitting device, according to the stored link information, wherein the link information includes a pair of identification information of which one is the link origin and the other is the link target. This identification information may be identification information of the content transmitting device, the content reproducing device itself, or another content reproducing device.

The usage restriction information may include decryption restriction information which restricts decryption of the content key with the key unique to the content transmitting device that is stored in the storage unit, and the usage restriction information may include transmission restriction information that restricts transmission of the key unique to the content transmitting device that is stored in the link information storage unit to another content reproducing device.

The content reproducing device may further have a link information issuing unit configured to issue the link information to another content reproducing device, and a device key encrypting unit configured to encrypt a device key unique to the content transmitting device with a device key unique to the other content reproducing device. In this case, the link information issuing unit can provide the other content reproducing device with one or a plurality of sets of link information stored in the link information storage unit for generating a path of which the origin is the content production device identified by the identification information and of which the destination is the content transmitting device identified by the identification information, the device key unique to the content reproducing device encrypted at the device key encrypting unit, and the usage restriction information stored in the link information storage device. According to this arrangement, the content reproducing device can let another content reproducing device to which link information has been issued use the content key encrypted with the key unique to the content transmitting device. Encrypting the device key unique to itself at the time of issuing link information with the key unique to the content reproducing device to which the link information is to be issued enables the key thereof to be safely provided to the content reproducing device to which the link information is to be issued. Also, providing usage restriction information enables usage of the content key by the content playing device at the issuing target to be restricted.

The content reproducing device may further have a restriction information generating unit configured to generate a second usage restriction information based on usage restriction information stored in the link information storage unit, and the link information issuing unit may provide the second usage restriction information to the other content reproducing device.

According to another embodiment of the present invention, a computer program is provided which causes a computer to functions as the content reproducing device. According to a further embodiment of the present invention, a storage medium is provided which stores the computer program in a computer-readable format. According to yet another embodiment of the present invention, a content reproducing method is provided.

Thus, usage conditions can be set for multiple contents, and be set separately for each device which uses the contents.

BRIEF DESCRIPTION OF THE DRAWINGS

FIG. 6 is an explanatory diagram illustrating stored contents of a user information storage unit according to the embodiment;

FIG. 23 is a flowchart illustrating link information issuing permission determining processing of the content reproducing device according to the embodiment.

DESCRIPTION OF THE PREFERRED EMBODIMENTS

Figure 1:
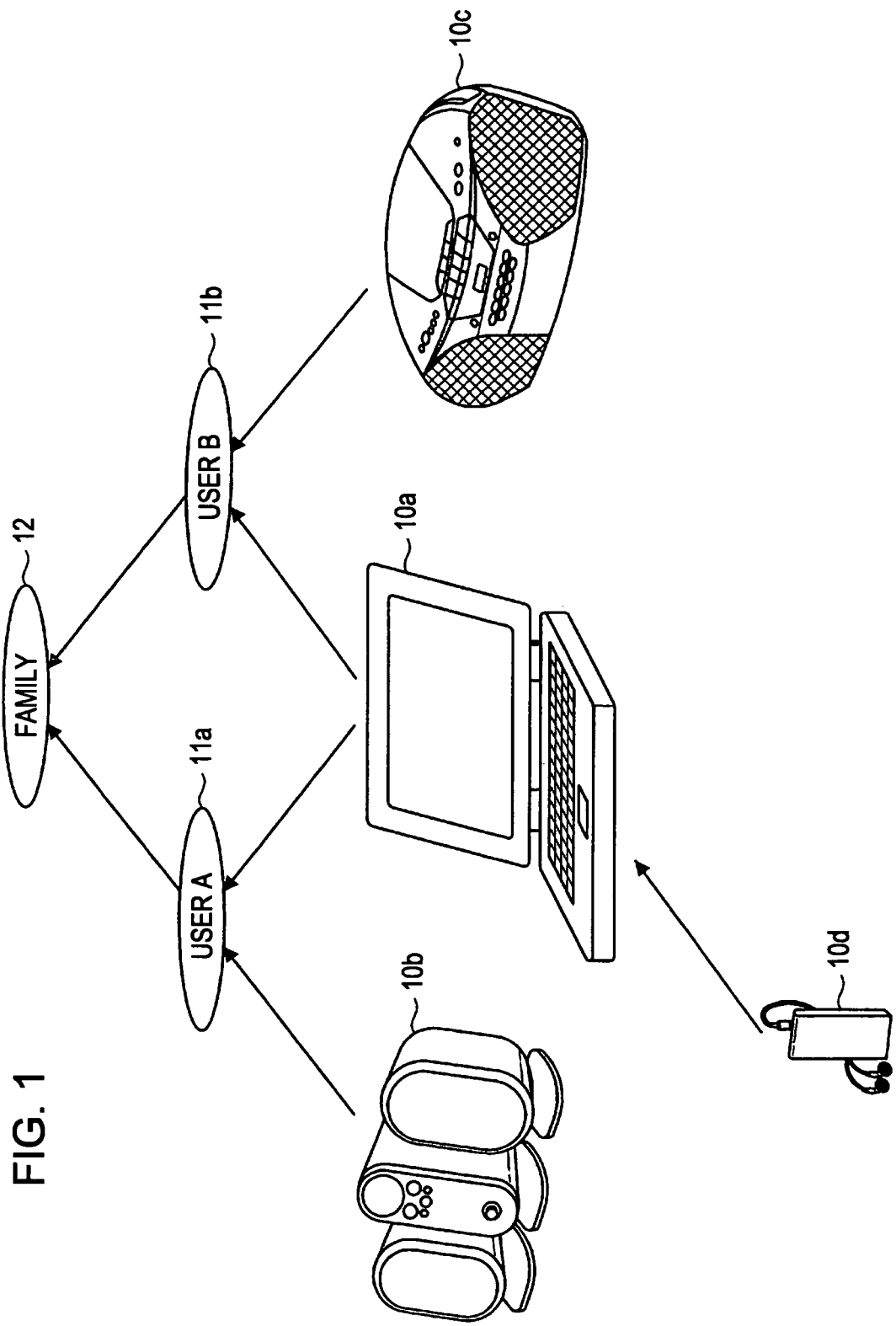
FIG. 1 is an explanatory diagram illustrating the overview of a linking method of a content providing system, for describing linked copyright management employed in a first embodiment of the present invention.

A preferred embodiment of the present invention will now be described in detail, with reference to the attached drawings. In order to avoid redundant description, components which have essentially the same functionality are denoted with the same reference numerals in the present Specification and the drawings, and repetitive description will be omitted.

The present embodiment will be described by way of an example wherein the content providing system according to the present invention is applied to a content providing system 500 capable of setting usage conditions including content reproduction period, permission to transfer contents to other device, and so forth, for each device which reproduces contents.

First, the overview of the content providing system 500 according to the present embodiment will be described. The content providing system 500 enables a content acquirer, who has validly acquired contents from a content providing server, operated by a service provider which provides pay contents, by performing billing processing or the like, to share the acquired contents with other users. However, enabling the acquirer who has validly acquired the contents to freely provide the acquired contents to all users is problematic in that the service provider is robbed of new sales opportunities of the contents, and also is problematic from the perspective of copyright protection of the contents. Accordingly, the content providing system 500 performs the linked copyright protection described below, to realize sharing of content between the acquirer and user.

1. Overview of Linked Copyright Protection

First, the overview will be described of a content providing system compatible with the linked copyright protection according to the present embodiment.

The content providing system according to the present embodiment is a system for managing the users and usage state of copyright-managed contents (hereafter referred to simply as "contents") wherein digital contents such as pictures, audio, etc., has been subjected to encryption processing. This content providing system restrict the usage of contents by users other than the user who has purchased the contents, in order to prevent unlawful usage of contents, such as large-scale distribution of contents via the Internet or the like, in a sure manner.

In order for the user who has purchased a content to reproduce the encrypted content, the user needs to decrypt the content with a content encryption processing key (hereafter referred to as "content key") used for encrypting the content. Even in the event that the content is distributed on the Internet in an unauthorized manner, the content cannot be reproduced without this content key. Accordingly, with the content providing system according to the present embodiment, an arrangement wherein the content key is safely distributed to and used by the correct user is important.

On the other hand, it is desirable that the user who has purchased the content is able to reproduce the content among multiple devices owned by the user, with a certain degree of freedom. Otherwise, the user might not be able to reproduce the content with his/her own devices, or only using the device used to purchase the content.

Thus, the content providing system according to the present invention employs a copyright managing system which allows sharing content within the range of private use while realizing copyright management, thereby improving the handiness and freedom of sharing contents between multiple devices which the user owns. In order to realize this copyright management, the present embodiment employs a linked copyright management scheme.

With linked copyright management, content can be shared between devices by correlating the devices one to another. In the present Specification, correlating devices one to another is called "linking". For example, linking a Device 1 owned by the user with a Device 2 owned by the user enables content capable of being reproduced with the Device 1 to be also reproduced with the Device 2. Though linking will be described later in detail, put simply, devices linked to a Device 1 which can reproduce a content can also reproduce the content, and devices not linked thereto cannot reproduce the content. Accordingly, contents can be reproduced with a certain degree of freedom among devices owned by the user, while implementing copyright management.

Note that "content" as used here refers to various types of content including, but not restricted to, audio contents such as music, performances, radio programs, and so forth, video contents both moving and still, such as movies, television programs, video programs, photographs, paintings/drawings, diagrams and charts, and so forth, electronic literature (so-called e-books, e-zines, and the like), games, software, and so forth. The following description is made based on the example of music content, and in particular music content distributed from a distribution server or ripped from music CD, but the present invention is by no way restricted to the examples illustrated here.

Next, the overview of the linking method in the content providing system according to the present embodiment as described above, for performing linked copyright management, will be described with reference to FIG. 1. FIG. 1 is an explanatory diagram illustrating the overview of the linking method of the content providing system according to the present embodiment.

As shown in FIG. 1, let us say that a user A has in his/her possession user devices 10*a*, 10*b*, and 10*d*. Further, let us say that the user A has signed up for a content providing service via the user device 10*a* and has purchased a content thereby. In the event that the user A wants to play the content on the user device 10*a* which is a self-owned device, the user A links the user device 10*a* to the user A. As described above, linking the user device 10*a* to the user A enables the content which the user A has purchased to be played on the user device 10*a*.

Now, what the term "links the user device 10*a* to the user A" means is for the user device 10*a* to obtain secret information of the user A. The term "secret information of the user A" means information which only the user A can originally know, and is a secret key of the user A, for example. In order to distribute a content key safely to the user A, the content key is encrypted with a public key or secret key of the user A and thus delivered to the user A, for example.

The user A attempts to play the content with the user device 10*a*, but if the user device 10*a* does not known the information of the secret key of the user A, the user device 10*a* cannot decrypt the content key, and accordingly the content cannot be played. Accordingly, if the user device 10*a* can link to the user A, i.e., if the user device 10*a* can acquire the information of the secret key of the user A, the content purchased by the user A can be played on the user device 10*a*.

In the same way, the user device 10*b* is linked to the user A. If the user device 10*b* can know the information of the secret key of the user A, the content purchased by the user A can also be played on the user device 10*b*.

In order for the secret key of the user A to be safely distributed to the user device 10*a*, the secret key of the user A should be encrypted by the public key or secret key of the user device 10*a* and distributed to the user device 10*a*. The secret key of the user A will then be decrypted by the user device 10*a*, and the content key will be decrypted with the decrypted secret key of the user A. Further, in the event that playing the content with the user device 10*d* is desired, the user device 10*d* can be linked to the user device 10*a* to this end. The user device 10*d* can obtain the secret key information of the user device 10*a*, and further obtain the information of the secret key of the user A using the secret key of the user device 10*a*. The user device 10*d* then can play the content which the user A has purchased using the secret key of the user A.

Thus, content purchased by an entity to which a device is linked to can be played on the device also, by tracing the link and obtaining the secret information of the entity to which the device is linked. For example, linking the user device 10*a* to the user B which is a member of the same family as the user A, content which the user B has purchased can also be played on the user device 10*a*. Further, linking the user A and the user B to the family enables both the user A and the user B to play content purchased by the family in the event that the family has signed up for the content providing service. Then, as described above, a user device linked to the user A and the user B will be capable of playing content purchased by the family with the user device.

Further, linking a user and a user device which the user owns, or linking user devices which the user owns one with another, enables users who can use the content to be restricted, and also allowing content to be shared among devices owned by the user with a certain degree of freedom, simply by safely distributing a content key to the user.

The overview of linked copyright management has been described so far. Next, a content providing system 100 will be described as a specific example of realizing linked copyright management.

2. Overall Configuration of Content Providing System

Figure 2:
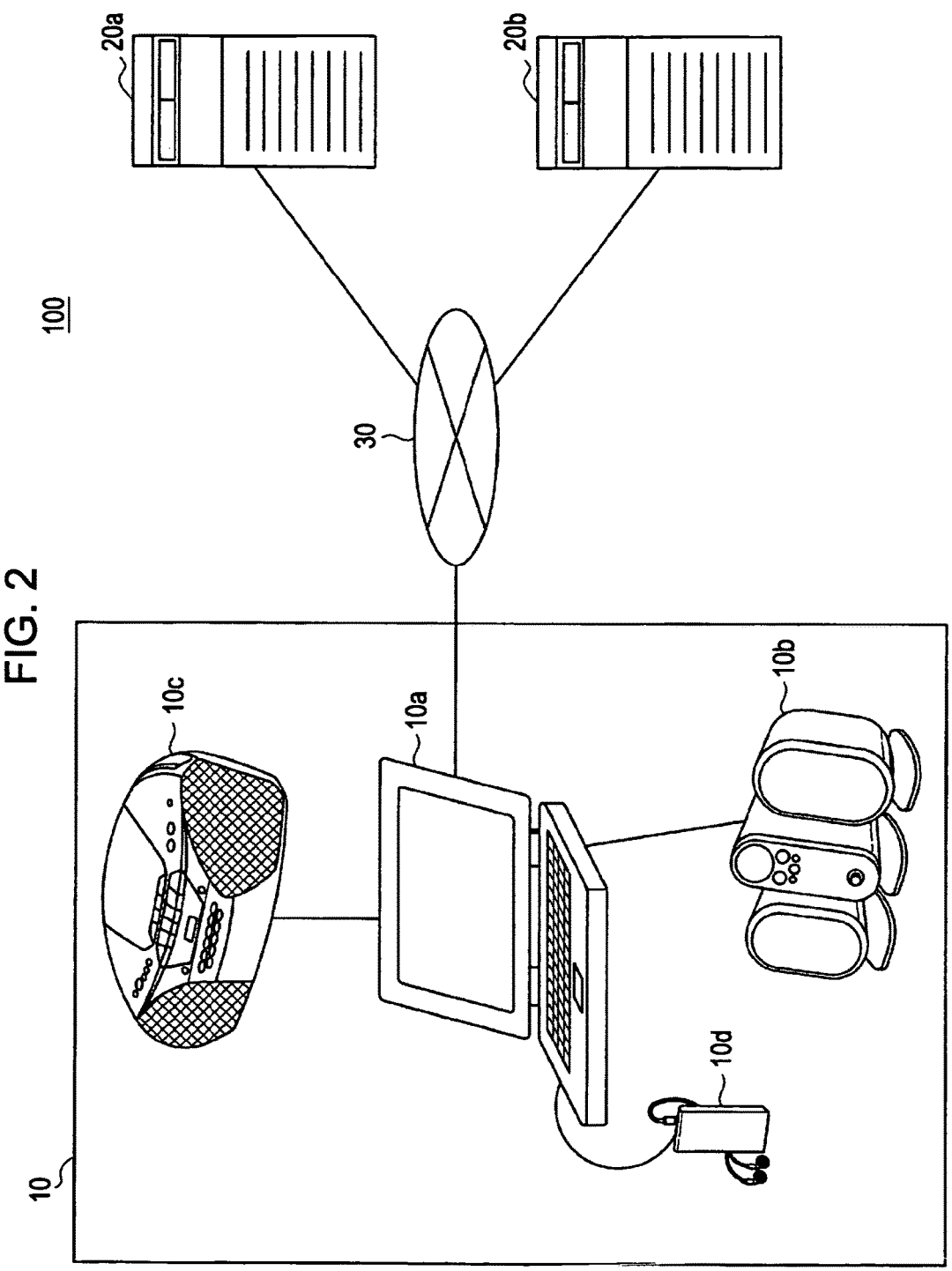
FIG. 2 is an overall configuration diagram of the content providing system according to the embodiment.

FIG. 2 is an overall configuration diagram of the content providing system 100 according to the present embodiment. As shown in FIG. 2, the content providing system 100 includes a user device 10, copyright management server 20*a*, content providing server 20*b*, and so forth. Also, as shown in FIG. 2, multiple user devices 10*a*, 10*b*, 10*c*, 10*d*, and so on, may be included in the user device 10. Further, while the copyright management server 20*a* and content providing server 20*b* are illustrated as being configured of separate servers, but these may be configured as a single server.

The user devices 10 are various types of information processing devices for using contents. FIG. 2 shows, as examples of the user devices 10, a notebook or desktop type personal computer (hereafter abbreviated to "PC") 10*a*, audio devices 10*b* and 10*c*, and a portable device (hereafter abbreviated to "PD") 10*d* which is a portable content player.

The user devices 10 have functionality for, for example, content usage functions (e.g., functions for playing, saving, transferring, splicing, dividing, converting, duplicating, lending, returning, and so forth, of contents), content play control functions based on the above-described linking, content management functions (e.g., functions for searching, deleting, etc., of content, content key, etc., based on content ID), content creating functions based on ripping or self-recording or the like, and so forth.

Of the user devices 10, a device having communication functions via a network 30 (e.g., the PC 10*a*) is capable of communication with the copyright management server 20*a* and content providing server 20*b*. Such a user device 10 is capable of downloading content distribution service software and copyright management software from the content providing server 20*b* for example, and installing the software. Thus, the user device 10 can be provided with distribution of encrypted contents from the content providing server 20*b*, and receive distribution of licenses including content keys and content usage conditions and the like for contents from the copyright management server 20*a*, and can store such data in a memory device such as a storage device or a removable storage medium or the like.

Also, the user device 10 can create new contents by self-recording (recording of audio, images, etc., within itself) or ripping for example, and stored the newly-created contents in a storage device or storage medium. Note that the term "self-recording" refers to storing audio, images, etc., taken with an image-taking device/sound collecting device which the user device 10 has, as visual/audio data. Also, the term "ripping" refers to extracting digital contents (audio data, video data, etc.) recorded in a recording medium such as a music CD, video DVD, software CD-ROM, etc., converting the extracted digital contents into a file format which can be processed on a computer, and recording in a storage device or removable storage medium.

As described above, as long as the user devices 10*b*, 10*c*, and 10*d* are linked to the PC 10*a*, contents which are downloaded to the PC 10*a* and can be played at the PC 10*a* can also be played at the linked user devices 10*b*, 10*c*, and 10*d*. The content key used to encrypt the content is needed at the time of playing the content at the user device 10. This content key has further been encrypted, and the user device 10 decrypts the content key by obtaining the key with which the content key has been encrypted, and decrypts the content with the content key, so that it can play the content on itself.

The copyright management server 20*a* is an information processing device which safely transmits the content key to the user, and performs linking processing to enable sharing of contents among devices which the user owns while restricting playing of the contents. Specifically, the copyright management server 20*a* performs operations such as registration processing of the user and user devices 10 which the user owns, linking of the user with user devices and linking of user devices one with another, and encrypting and transmitting the content key to the user devices 10.

The content providing server 20*b* is a server for providing contents, which provides content providing services to the user. The content providing server 20*b* distributes contents to a user device 10 via the network 30 in response to a request from the user device 10.

For example, in the event of distributing music content, the content providing server 20*b* is configured as a server for providing EMD (Electronic Music Distribution) services. In this case, the content providing server 20*b* compresses and encodes the music contents to be distributed with a compression encoding format such as ATRAC3 (Advanced Transform Acoustic Coding) or MP3 (MPEG Audio Layer-3), further encrypts this with an encryption format such as DES (Data Encryption Standard), and distributes this to the user device 10. Also, the content providing server 20*b* may encrypt and transmit to the user device 10 the content key for decrypting the contents, along with the contents encrypted in this way. Also, an arrangement may be made wherein the content providing server 20*b* provides the content key to the copyright management server 20*a* which then encrypts the content key and transmits to the user device 10.

Also, the content providing server 20*b* can be configured as a server for providing created content usage services for managing usage of contents which the user device 10 has created by itself by ripping, self-recording, etc., for example. In this case, the content providing server 20*b* distributes the content key for decrypting the contents to the user device 10. Accordingly, the user device 10 can play the contents which it has created by ripping or the like, based on the content key obtained from the content providing server 20*b*.

The network 30 is a communication line network for connecting the user device 10, copyright management server 20*a*, and content providing server 20*b*, in a communicable manner. Examples include the public line networks such as the Internet, telephone line networks, and satellite communication networks, dedicated line networks such as WANs, LANs, IP-VPNs, and so forth, and may be either cable-based or wireless.

The above content providing system 100 improves portability of contents between various types of user devices 10 while ensuring copyright management functions for restricting usage of contents, thereby improving ease-of-use for users and freedom of use of contents.

3. Hardware Configuration of User Device

Next, the hardware configuration of the user device 10 according to the present embodiment will be described. In the following the hardware configuration of the PC 10*a* and PD 10*b* will be described as representative examples of user devices 10. Note that the PC 10*a* and PD 10*b* which are user devices 10 are configured as exemplary manifestations of the content processing apparatus according to the present invention.

Figure 3:
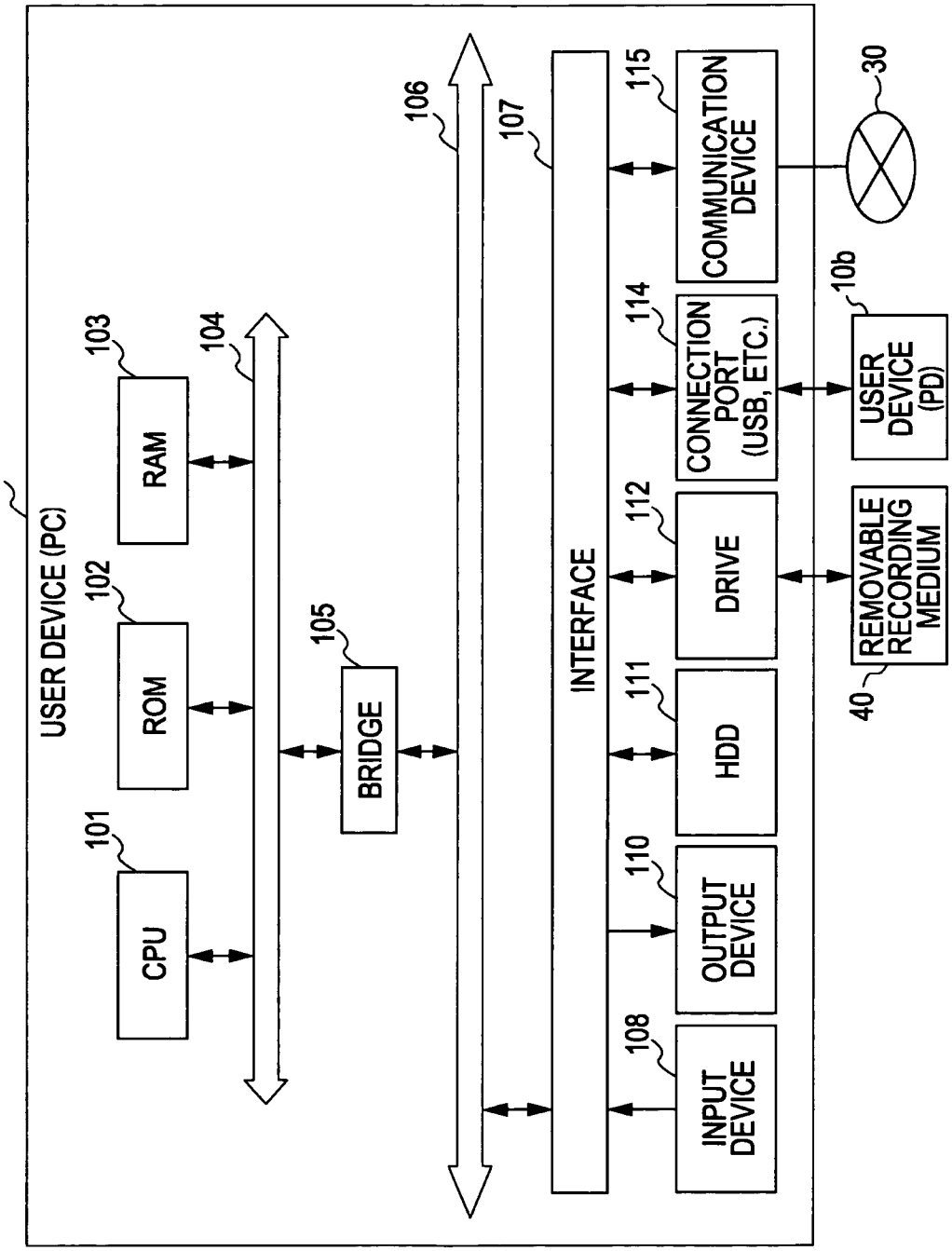
FIG. 3 is a block diagram schematically illustrating a hardware configuration example of a Personal Computer in the embodiment.

First, the hardware configuration of the PC 10*a* according to the present embodiment will be described with reference to FIG. 3. FIG. 3 is a block diagram schematically illustrating a hardware configuration example of the PC 10*a* according to the present embodiment.

As shown in FIG. 3, the PC 10*a* has, for example, a CPU (Central Processing Unit) 101, ROM (Read Only Memory) 102, RAM (Random Access Memory) 103, a host bus 104, a bridge 105, an external bus 106, an interface 107, an input device 108, an output device 110, a storage device (HDD) 111, a drive 112, a connection port 114, and a communication device 115.

The CPU 101 functions as a computation processing device and control device, operating according to various programs stored in the ROM 102 and/or HDD 111 to control the components of the PC 10*a*. Specific examples of processing include encryption and decryption processing of contents, generating and verification processing of digital signatures (MAC (Message Authentication Code), etc.) for preventing data tampering and for verifying data, authentication and session key sharing processing performed at the time of inputting/outputting content and the like with other user devices 10 connected thereto, input/output processing control of contents, licenses, content keys, etc., copyright management processing such as license evaluation, and so forth.

The ROM 102 stores programs which the CPU 101 uses, computation parameters, and so forth. The ROM 102 can also be used as a memory device for saving contents, licensees, content keys, and so forth. The RAM 103 temporarily stores programs used by the CPU 101, parameters which change as the CPU 101 executes the programs, and so forth. These components are mutually connected by a host bus 104 configured of a CPU bus and the like.

The host bus 104 is connected with the external bus 106 such as a PCI (Peripheral Component Interconnect/Interface) bus or the like via the bridge 105.

The input device 108 is configured of operating units such as a mouse, keyboard, touch panel, buttons, switches, levers, etc., and an input control circuit for generating input signals to be output to the CPU 101. The user of the PC 10*a* operates the input device 108 to input various types of data to the PC 10*a* and instruct processing actions.

The output device 110 is configured of a display device such as, for example, a CRT (Cathode Ray Tube) display device, LCD (Liquid Crystal Display) device, lamps, or the like, and an audio output device such as a speaker or the like. The output device 110 outputs, for example, contents being played. Specifically, the display device displays the played video contents in the form of text or images, as moving or still images. On the other hand, the audio output device outputs the played audio contents as sound.

The HDD 111 is a device for storing data, configured as an example of a memory device of the CP 10*a* according to the present embodiment. The HDD 111 stores programs to be executed by the CPU 101 and various types of data in a hard disk. Also, the HDD 111 stores various types of data such as, for example, contents, licenses, content keys, and so forth.

The drive 112 is a storage media reader-writer, and is either built into or externally attached to the PC 10*a*. The drive 112 records/reproduces various types of data such as, for example, contents, licenses, content keys, and so forth, to/from removable storage media 40 such as magnetic disks (HD, etc.), optical disks (CD, DVD, etc.), magneto-optical disks (MO, etc.) semiconductor memory, and so forth, loaded to the PC 10*a*.

Specifically, the drive 112 reads out data stored in the removable storage media 40 and supplies this to the RAM 103 connected via the interface 107, external bus 106, bridge 105, and host bus 104. This data is stored by the CPU 101 in the ROM 102 or HDD 111 if necessary. On the other hand, the device 112 receives, from the CPU 101, data stored in the ROM 102 or HDD 111 or the like, data newly generated, and data obtained from an external device, and writes the data to the removable storage medium 40.

The connection port 114 is a port for connecting the PC 10*a* with an external peripheral device such as another user device 10 for example, and has connection terminals such as USB, IEEE 1394, and so forth. The connection port 114 is connected to the CPU 101 and the like via the interface 107, external bus 106, bridge 105, host bus 104, and so forth. The connection port 114 allows the PC 10*a* to be connected to the PD 10*b* and the like via a local line 30*b*, so as to be capable of various types of data communication.

The communication device 115 is a communication interface configured of a communication device or the like for connecting to the network 30 (including the network 30*a*), for example. The communication device 115 exchanges various types of data such as contents and content keys with external devices, such as other user devices 10, the copyright management server 20*a*, the content providing server 20*b*, and so forth, via the network 30.

Next, the hardware configuration of the PD 10*d* according to the present embodiment will be described with reference to FIG. 4, which is a block diagram schematically illustrating a hardware configuration example of the PD 10*d* according to the present embodiment.

Figure 4:
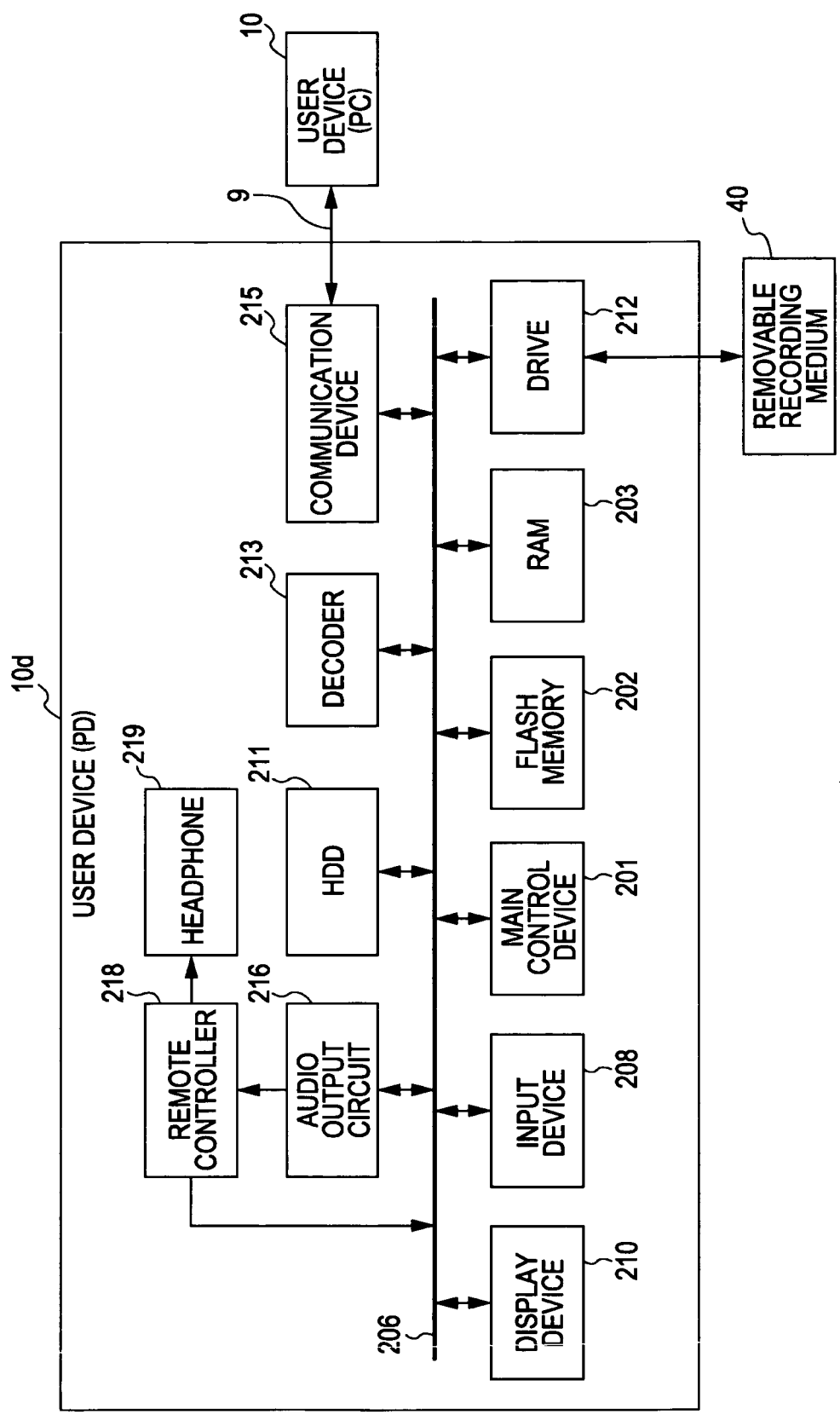
FIG. 4 is a block diagram schematically illustrating a hardware configuration example of a Portable device in the embodiment.

As shown in FIG. 4, the PD 10*d* has, for example, a control device 201, flash memory 202, RAM 203, a bus 206, an input device 208, a display device 210, an HDD 211, a drive 212, a decoder 213, a communication device 215, an audio output circuit 216, a remote controller 218, and a headphone set 219.

The control device 201 operates according to, for example, various programs stored in the flash memory 202 and/or HDD 211 to control the components of the PD 10*d*. The flash memory 202 stores programs which stipulate the operations of the control device 201, and various types of data, for example. The flash memory 202 can also be used as a memory device for saving contents, licensees, content keys, and so forth. The RAM 203 is configured of SDRAM (Synchronous DRAM) for example, and temporarily stores various types of data relating to the processing performed by the control device 201.

The bus 206 is a data line for connecting the control device 201, flash memory 202, RAM 203, data processing device 204, input device 208, display device 210, HDD 211, drive 212, decoder 213, communication device 215, and audio output circuit 216 and the like.

The input device 208 and remote controller 218 configured of operating units such as a touch panel, button keys, levers, dials, etc., and an input control circuit for generating input signals corresponding to operations the user performs on the operation units, to be output to the control device 201. The user of the content processing device 10 operates the input device 208 or later-described remote controller 218 to input various types of data to the content processing device 10 and instruct processing actions.

The display device 210 is configured of an LCD panel and LCD control circuit, for example. The display device 210 displays various types of information in text or images, according to the control performed by the control device 201.

The HDD 211 is a device for storing data, configured as an example of a memory device of the PD 10*d* according to the present embodiment. The HDD 211 is configured of a hard disk drive (HDD) having a storage capacity in the order of tens of gigabytes for example, and stores various types of data such as contents, licenses, content keys, and programs for the control device 201, and so forth. The PD 10*d* having the HDD 211 is configured as a recorder/player device capable of recording and playing contents. Accordingly, in addition to contents provided from the PC 10*a* via the removable storage medium 40, contents received from the PC 10*a* or the like via a local line can be stored in the HDD 211 and played. However, the PD 10*d* is by no means restricted to this example, and may be configured as a content playback-only device with no HDD 211. In this case, the PD 10*d* is capable only of reading and playing contents stored in the removable storage medium 40 for example, and is incapable of recording.

The drive 212 is a storage media reader-writer, and is built into the PD 10*d*. The drive 212 records/reproduces various types of data such as, for example, contents, licenses, content keys, and so forth, to/from the above-described various types of removable storage media 40 loaded to the PD 10*d*. The decoder 213 performs decoding processing of encoded contents, surround sound processing, conversion to PCM data, and so forth.

The communication device 215 is configured of a USB controller and USB terminal and the like for example, and exchanges various types of data such as contents, licenses, content keys, control signals, and so forth, with user devices 10 such as the PC 10*a* connected via the local line 30*b* such as a USB cable or the like.

The audio output circuit 216 amplifies the analog audio data that has been D/A converted by the control device 201 following decoding at the decoder 213, and outputs to the remote controller 218. The analog audio data is output from the remote controller 218 to the headphone set 219, and is output as audio from speakers (not shown) built into the headphone set 219.

Hardware configuration examples of the PC 10*a* and PD 10*d*, which are examples of a user device 10, have been described with reference to FIGS. 3 and 4. However, user devices 10 which use contents are not restricted to the above examples of the PC 10*a* and the PD 10*d*, and as illustrated in FIG. 2, stationary audio players 10*b* and 10*c*, and further, various electronic devices and information processing devices, such as television sets, cellular phones, and so forth, may serve as a user device 10. Accordingly, each user device 10 executes processing corresponding to its own to unique hardware configuration.

4. Functional Configuration of Copyright Management Server

Figure 5:
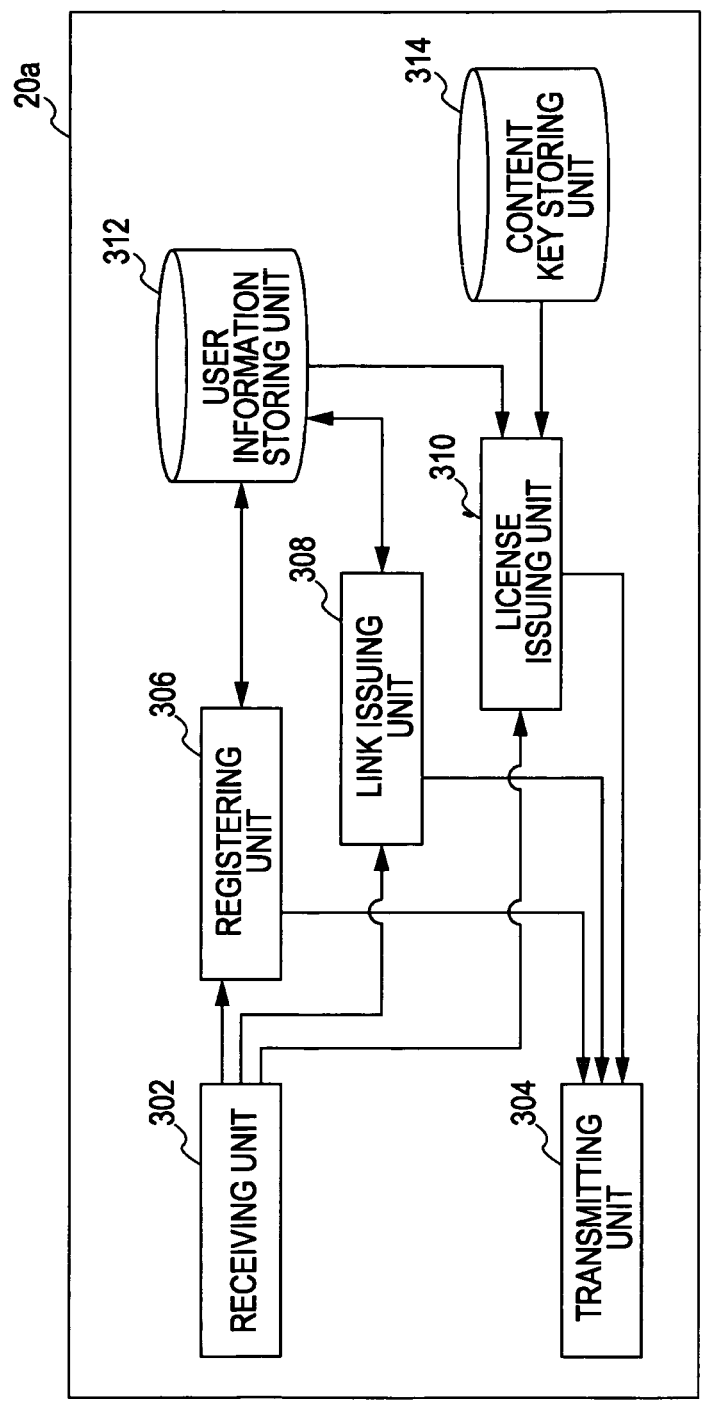
FIG. 5 is a functional configuration diagram of a copyright management server according to the embodiment.

Next, the functional configuration of the copyright management server 20a will be described with reference to FIG. 5. As shown in FIG. 5, the copyright management server 20a includes a reception unit 302, transmission unit 304, registration unit 306, link issuing unit 308, license issuing unit 310, user information storage unit 312, content key storage unit 314, and so forth.

The receiving unit 302 is a communication interface configured of a communication line, communication circuit, communication device, and so forth, and is for receiving attribute information of a user terminal 10 connected via the network 30, receiving information input at the user terminal 10, and so forth.

The registration unit 306 performs registration processing for new users desiring to use the content providing service and/or copyright management service, processing for changing registrations, processing for cancellation of registration, management of user account information (user ID, credit card No., password, etc.), and so forth. Each user registered for service is provided with a unique key. The key provided here may be a pair of public key and secret key used with public key encryption, or may be a shared key used with secret key encryption. This key information is stored in the user information storage unit 312 along with a user ID.

Also, the registration unit 306 performs management of a user device which the user owns. The registration unit 306 obtains specific information regarding the user device (type of equipment, model, version, etc.) via the receiving unit 302, and provides a device ID and user device unique key. Here, the device ID is identification information whereby the user device can be uniquely identified. An arrangement may be made wherein a device ID set in the user device beforehand is obtained and the user device is managed with that device ID.

Key information thus provided at the registration 306 is stored in the user information storage unit 312 in a manner correlated with the user ID or device ID, where node information is generated of the user ID or device ID and key information, and transmitted to each user or each user device via the transmitting unit 304. The user or user device which has received the node information thus acquires an ID which is uniquely distinguished at the copyright management server 20a.

The key provided from the registration unit 306 is used for encrypting the content key by the server, decrypting the encrypted content key by the user device, and so forth. For example, in the event that the server encrypts a content key with the public key of the user, the user who has received the content key needs to decrypt the content key with the secret key of the user. Accordingly, in this case, the secret key of the user needs to be transmitted to the user beforehand.

The link issuing unit 308 has functions for correlating users with user devices owned by the user, correlating user devices owned by the user one with another, and so forth. Specifically, link issuing unit 308 generates link information for linking a user device with a user in accordance with input from user device, transmits the link information to the user device, and also stores this in the user information storage unit 312. For example, let us say that a user registered in the copyright management service wants to freely play purchased contents on three user devices owned by the user. The user transmits link requests for the three user devices owned by the user to the copyright management server 20a. The link issuing unit of the copyright management server 20a links the three user devices owned by the user with the user upon receiving the link requests.

Now, the term "links the three user devices with the user" means encrypting the secret key of the user stored in the user information storage unit 312 with the public key of each user device. In the event that the content key for decrypting a content purchased by the user has been encrypted with the secret key of the user, the encrypted content key cannot be decrypted except with the secret key of the user. However, linking a user device owned by the user with the user allows the secret key of the user to be obtained at the user device owned by the user and the content key to be decrypted, and further, content encrypted with the content key to be decrypted and played.

The user information storage unit 312 stores, in a correlated manner, the user ID or device ID, key information, and link information. The copyright management server 20a can obtain key information corresponding to each user or user device stored in the user information storage unit 312 by obtaining the user ID or device ID.

Now, the user information stored in the user information storage unit 312 will be described with reference to FIG. 6. As shown in FIG. 6, the user information storage unit 312 stores information such as user ID 3121, credit card No. 3122, user key 3123, device ID 3124, device key 3125, link 3126, and so forth.

The user ID 3121 and credit card No. 3122 are user account information of the user receiving the content providing service and the copyright management service, and are identification information uniquely identifying the user. The user key 3123 is key information assigned to one user ID 3121.

The device ID 3124 is the ID of a user device linked to a user, with the ID of the user device owned by the user being stored therein. The device key 3125 is a number uniquely distinguished in the content providing system 100, and may be an identification No. set in the user device at the time of shipping, or may be an identification No. set by the registration unit 306 of the copyright managing server 20a.

The device key 3125 stores key information assigned to each user device. The device key 3125 also may store the device key set in the user device beforehand or may store the key information assigned by the registration unit 306.

The link 3126 stores link information set for each user device. For example, in the event that a user device 1 is linked to "Yamada Taro", "link A" includes the direction of correlation between the device ID and user ID, and information obtained by encrypting the user key A (secret key) with the device key 1 (public key). The link 3126 may be transmitted to each user device and stored in a storage unit of the user device, or the user device may access the server to obtain its own link information. The above has been description of information stored in the user information storage unit 312.

Returning to FIG. 5 now, the license issuing unit 308 issues a license including a content key to a user who has purchased a content. At this time, the license issuing unit 310 encrypts the content key included in the license with the secret key of the user, and thus can safely distribute the content key to the user. Also, the license may include content usage conditions and so forth. The content key and content usage conditions may also be provided from the content providing server 20b.

The license issued at the license issuing unit 310 is transmitted to the user device 10 via the transmitting unit 304. Or, the license may be stored in the user information storage unit 312.

The license includes content ID and the like for identifying contents. The user may obtain the license from the copyright management server 20a following purchasing the content, or may obtain the license before purchasing the content and then purchase the content later.

Also, the content key storage unit 312 storing the content key and the license issuing unit 310 may be provided within the content providing server 20b. In this case, the content providing server 20b may be arranged to obtain information such as the user key for encrypting the content key from the copyright management server 20a, so as to encrypt the content key and generate the license. The license generated at the content providing server 20b may be transmitted to the user device owned by the user along with the content.

The transmitting unit 304 is a communication interface configured of a communication line, communication circuit, communication device, and so forth, and functions to transmit node information issued based on registration processing performed at the registration unit 306, link information issued by the link issuing unit 308, and licenses issued by the license issuing unit 310, to the user device 10 via network.

Content keys are stored in the content key storage unit 314, and a content key generated at the content providing server 20b may be received and stored, or a content key may be generated in the copyright management server 20a and stored. For example, a content key may be generated at the copyright management server 20a, the content key may be transmitted to the user device, and further transmitted to the content providing server 20b. The content providing server 20b which has received the content key may encrypt the content which the user has purchased with that content key and transmit the encrypted content to the user device 10.

The above has been description of the functional configuration of the copyright management server 20a. Next, a linked content providing method using the content providing system 100 will be described. FIGS. 7 through 10 are timing charts illustrating the basic flow of the linked content providing method according to the present embodiment. Secure communication connection is realized between the user device (PC) 10 and copyright management server 20a included in the content providing system 100, through the network 30.

5. User Device and User Registration Method

Figure 7:
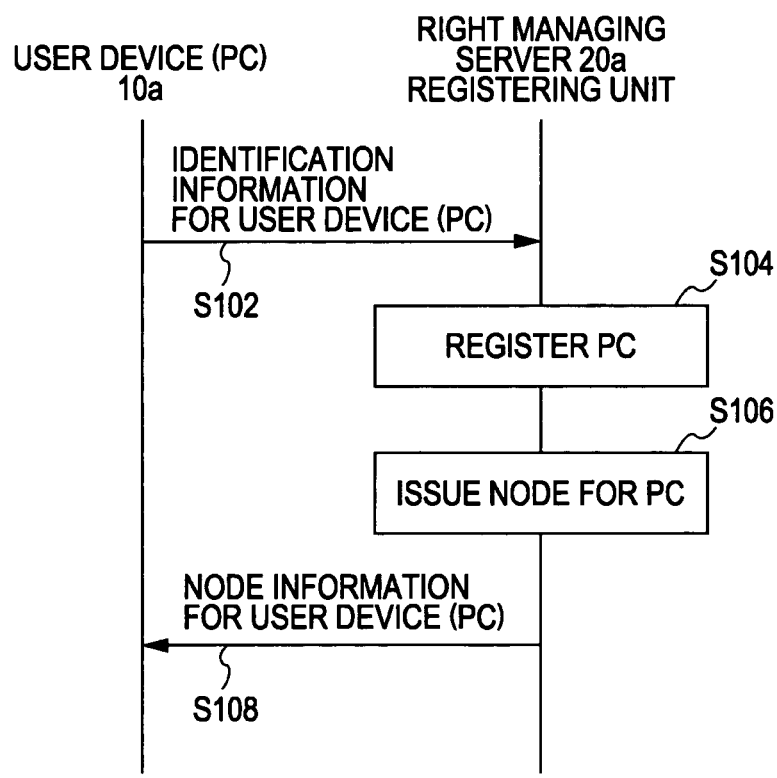
FIG. 7 is a timing chart illustrating registration processing of a Personal Computer in the embodiment.

FIG. 7 is a timing chart for describing the registration method for, of the user devices, the user device (PC) 10a connected to the network. First, identification information of the user device (PC) 10a is transmitted to the copyright management server 20a (S102). Now, user device identifying information is information whereby the user device can be identified, such as the device type, model, version, etc., of the user device. This user device identifying information may be transmitted from the user device (PC) 10a from user input, or in the event that the identification information is set in the user device (PC) 10a beforehand, may be transmitted to the copyright management server 20a following communication connection being established between the user device (PC) 10a and the copyright management server 20a.

In step S102, the copyright management server 20a which has received the identifying information of the user device (PC) 10a stores the identifying information in a user information storage unit provided within the copyright management server 20a (S104). Also, the copyright management server 20a provides a device ID which can uniquely identify the user device (PC) 10a in the copyright management server 20a, based on the transmitted identifying information for the user device (PC) 10a. Further, the copyright management server 20a issues a device key for each user device. The issue device ID and device key are correlated with the identifying information of the user device (PC) 10a, and stored in the user information storage unit. The device key is a key issued for each device, and may be a pair of public key and secret key used with public key encryption, or may be a shared key used with secret key encryption.

Following registration of the user device (PC) 10a in step S104, the copyright management server 20a issues a node including the device ID and device key issued in step S104 (S106). The node issued in step S106 is information whereby the copyright management server 20a can uniquely identify each of the user devices, and includes at least the device ID, but also may include the device key and identifying information of the user device (PC) 10a, and so forth. The node issued in step S106 is transmitted to the user device (PC) 10a (S108).

The user device (PC) 10a stores the node information transmitted to the copyright management server 20a in memory of the user device (PC) 10a.

The above has been description of the registration method of the user device (PC) 10a connected to the network. Next, a registration method of a user device not connected to the network, such as the PD 10d for example, will be described with reference to FIG. 8.

Figure 8:
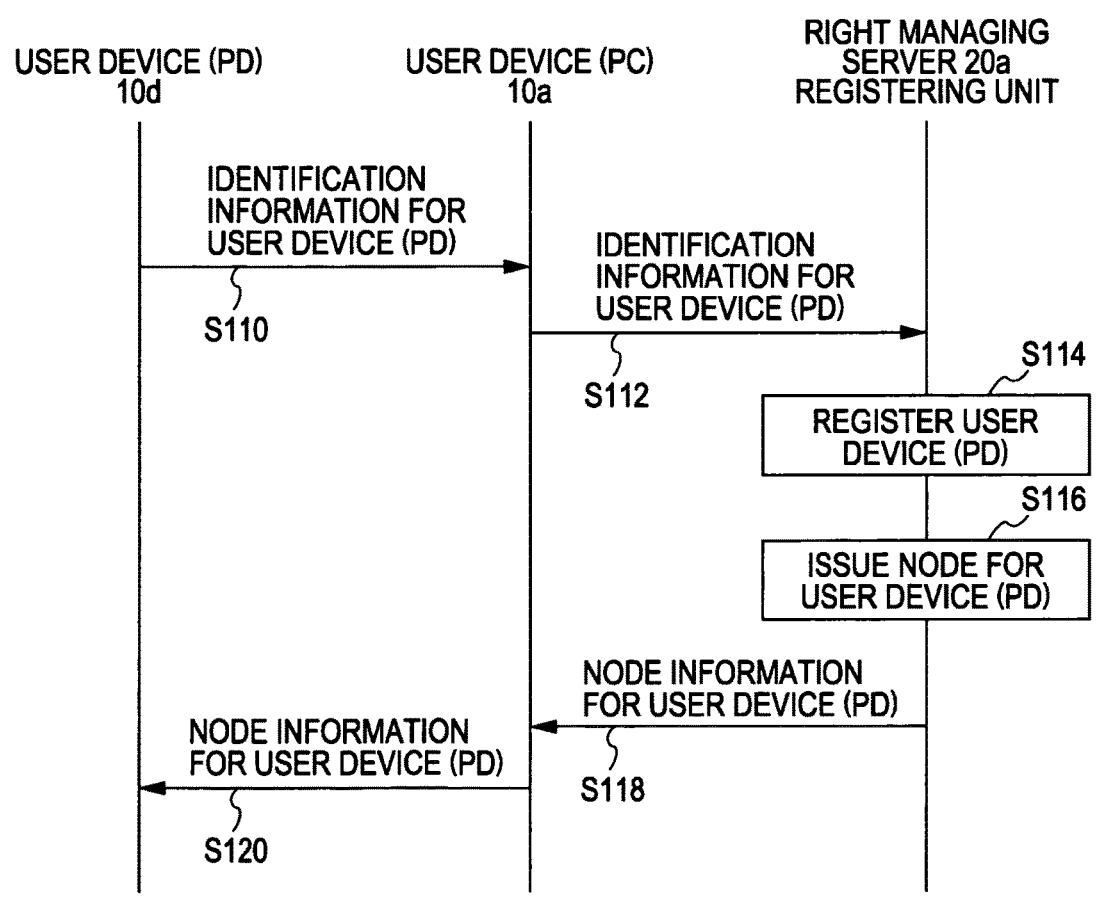
FIG. 8 is a timing chart illustrating registration processing of a Portable device in the embodiment.

FIG. 8 is a timing chart describing the registration method for the user device (PD) 10d not connected to the network. First, identifying information of the user device (PD) 10d is provided to the user device (PC) 10a (S110). For example, the device type, model, version, etc., of the user device (PD) 10d may be transmitted to the user device (PC) 10a following the user device (PD) 10d being connected to the user device (PC) 10a, or the identifying information of the user device (PD) 10d may be transmitted to the user device (PC) 10a according to user input.

The user device (PC) 10a which has obtained the identifying information of the user device (PD) 10d in step S110 then transmits the identifying information of the user device (PD) 10d to the copyright management server 20a (S112). The copyright management server 20a, which has received the identifying information of the user device (PD) 10d in step S112 performs registration of the user device (PD) 10d (S114). The copyright management server 20a stores the identifying information of the user device (PD) 10d in the user information storage unit in step S114, issues a device ID and device key for the user device (PD) 10d, and stores these in the user information storage unit in a manner correlated with the identifying information of the user device (PD) 10d.

Following performing registration processing of the user device (PD) 10d in step S114, the copyright management server 20a issues a node for the user device (PD) 10d (S116). As described above, the node issued in step S116 includes identification information whereby the copyright management server 20a can identify the user device (PD) 10d, device key, and so forth. The node of the user device (PD) 10d issued in step S116 is transmitted to the user device (PC) 10a (S118). The user device (PC) 10a which has received transmission of the node of the user device (PD) 10d from the copyright management server 20a in step S118 provides the node information of the user device (PD) 10d to the user device (PD) 10d (S120). The user device (PD) 10d which has been provided with the node information in step S120 stores the node information in a storage unit such as memory or the like. The node information of the user-device (PD) 10*d* may also be stored in the memory of the user device (PC) 10*a*.

In order to obtain the content and the content key for decrypting the content, the user device (PD) 10*d* needs to be connected to the user device (PC) 10*a*. Accordingly, if the user device (PC) 10*a* stores the information of the user device (PD) 10*d*, the user device (PC) 10*a* can determine whether or not the transmitted content can be played on the user device (PD) 10*d*.

The above has been description of the registration method of the user device (PD) 10*d* which is not connected to the network. Next, the registration method of a user who uses a user device will be described with reference to FIG. 9.

Figure 9:
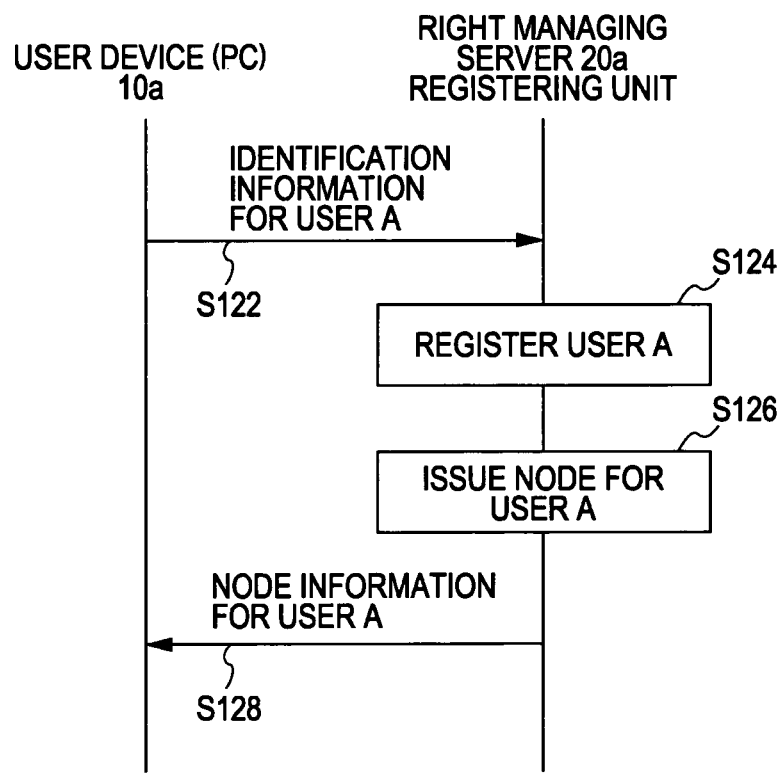
FIG. 9 is a timing chart illustrating registration processing of a user in the embodiment.

FIG. 9 is a timing chart describing a user registration method. The registration processing of a user A is performed through the user device (PC) 10*a* connected to the network. First, identifying information of the user A is transmitted to the copyright management server 20*a* (S122). Now, identifying information of the user A is a user ID of the user A and a credit card No. of the user A and so forth. The user ID is identification information which can be uniquely identified at the copyright management server 20*a*, and may be identification information specified by the user A, or may be provided by the copyright management server 20*a*.

The copyright management server 20*a* to which the identifying information of the user A has been transmitted in step S122 performs registration processing of the user A (S124). In step S124, the copyright management server 20*a* stores the user ID and credit card No. and the like of the user A in the user information storage unit. Also, the copyright management server 20*a* issues a user key for the user A, and stores this in the user information storage unit in a manner correlated with the user ID and the like.

The copyright management server 20*a* then issues a node for the user A including the user ID and user key stored in the user information storage unit (S126). The copyright management server 20*a* transmits the node information issued in step S126 to the user device (PC) 10*a*.

As described above, the user owning the user device registers the user device which he/she owns in the copyright management server 20*a* via the network, and also performs user registration for the user using the content providing service and copyright management service. Accordingly, the copyright management server 20*a* which provides the copyright management service can store information of the user who desires to use the copyright management service and information of the user device which the user owns in the user information storage unit, and manage this information. Also, key information issued regarding each user and each user device can be stored in the user information storage unit in correlation with the user or user device and managed.

The copyright management server 20*a* can obtain the user ID of the user A via the user device connected to the network, and know the user device which the user owns and key information of the user. For example, in order to safely distribute the content key with which the contents has been encrypted, the content key may be further encrypted with the user key of the user A. The copyright management server 20*a* obtains the encryption key of the user A stored in the user information storage unit based on the user ID of the user A that has been obtained, and encrypts the content key with the user key of the user A. The content key which has been encrypted with the public key of the user A cannot be decrypted unless using the secret key of the user A, so the copyright management server 20*a* can safely transmit the content key to the user. Further, only the user A who has purchased the content is capable of decrypting the content key, so users capable of decrypting the content key can be restricted.

However, even if the content key can be decrypted with the encryption key of the user A, the user A cannot listen to the content unless the content can be played on the user device of the user A. With the present embodiment, the content purchased by the user A can be played on the user device by correlating the user device with the user. Next, correlating of the user A and the user device will be described.

6. Correlation of User A and User Device

Figure 10:
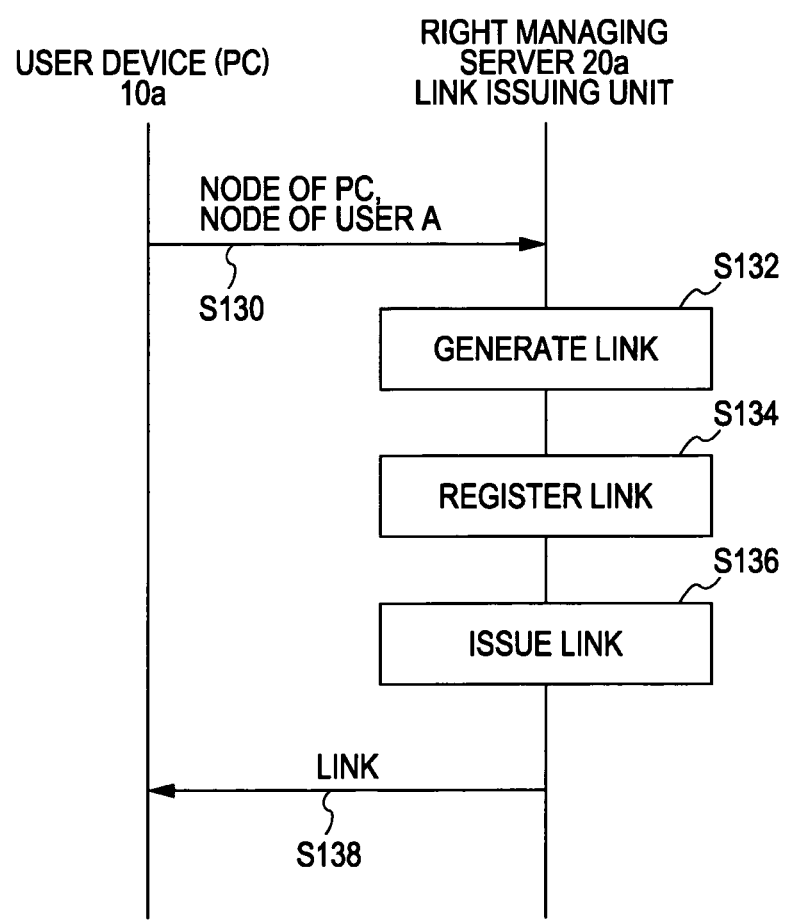
FIG. 10 is a timing chart illustrating link processing in the embodiment.
Figure 11:
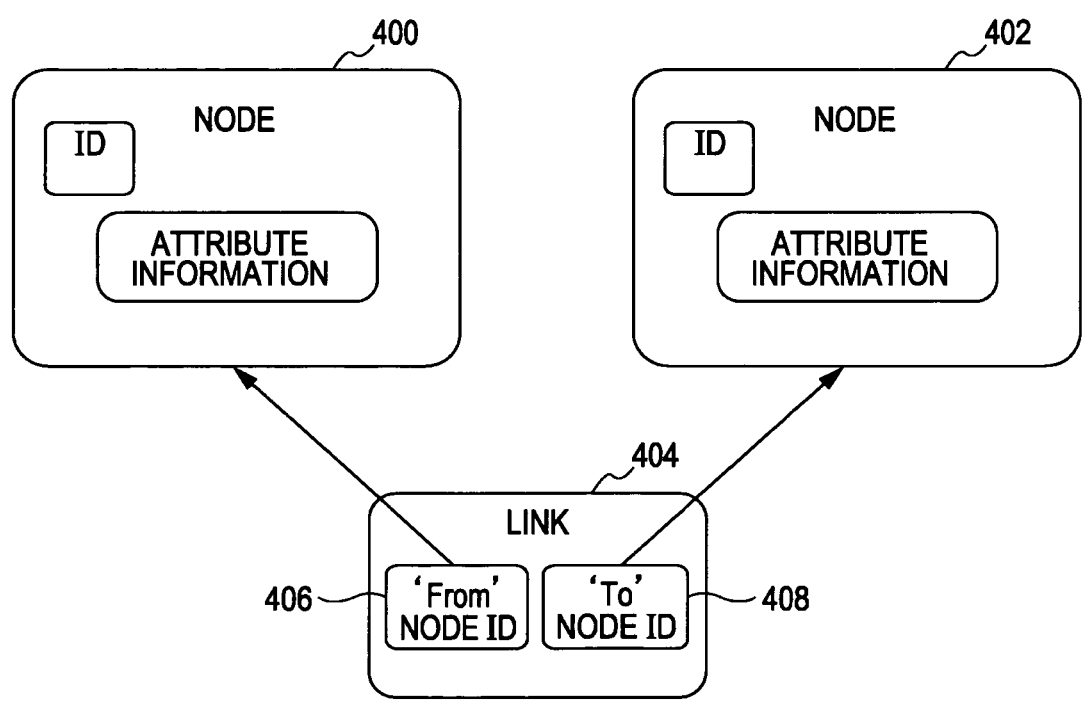
FIG. 11 is an explanatory diagram illustrating the contents of link information in the embodiment.

FIGS. 10 and 11 are timing charts for describing correlation of the user A and the user device. First, correlation of the user device (PC) 10*a* connected to the network and the user A will be described. In the event of correlating the user device (PC) 10*a* and the user A, the node of the user device (PC) 10*a* issued by the above-described registration processing and the node of the user A are transmitted to the copyright management server 20*a* (S130).

The copyright management server 20*a* which has obtained the node information of the user device (PC) 10*a* and the node of the user A in step S130 generates a link correlating the user device (PC) 10*a* and the user A (S132). The link generated in step S132 includes, for example, the node information of the user device (PC) 10*a*, the node information of the user A, and the direction of correlation. It is sufficient that the node information included in the link information be that whereby the user device and user can be uniquely identified, and may be the device ID of the user device and user ID of the user. The direction of correlation is information indicating which node is correlated with which node. In the event that the user device (PC) 10*a* is correlated with the user A, and correlation direction is information representing the direction from the user device (PC) 10*a* which is the link origin to the user A who is the link target.

Now, the link generated in step S132 will be described in detail with reference to FIG. 11. As described above, the copyright management server 20*a* manages the user device (PC) 10*a* and the user A as nodes according to device ID and user ID. Upon this node information 400 and 402 being transmitted to the copyright management server 20*a*, the copyright management server 20*a* sets the information of "From" 406 and "To" 408 included in the link 404. In the event of correlating the user device (PC) 10*a* with the user A, the node ID of the user device (PC) 10*a* serving as the link origin is set to "From" and the node ID of the user A serving as the link target is set to "To". Note that a node ID is identification information for identifying the node of the user device (PC) 10*a* and the user A and the like, and may be the device ID of the user device (PC) 10*a* or the user ID of the user A.

Also, the link 404 may include key information wherein the secret information of the user A serving as the link target has been encrypted with the public key of the user device (PC) 10*a*. Secret information of the user A is information which only the user A is originally capable of knowing, and is information such as the secret key of the user A or the like.

Returning to FIG. 10, the link information generated in step S132 is correlated with the device ID of the user device (PC) 10*a* serving as the link origin, and is stored in the user information storage unit (S134). Accordingly, the copyright management server 20*a* can manage which user device stored in the user information storage unit is correlated with which user. Link information including the direction of correlation between the device ID of the user device and the user ID of the user is issued (S136), and transmitted to the user device (PC) 10a (S138). As described above, link information transmitted to the user device (PC) 10a may include key information wherein the secret information of the user A has been encrypted with the public key of the user device (PC) 10a.

The user device (PC) 10a which has received the link information in step S138 can know which user it has been correlated with, based on the received link information. Also, in the event that the user device (PC) 10a has been correlated with the user A, the user device (PC) 10a can know the secret information of the user A by the key information included in the link. For example, in the event that the user A has registered in the content providing service and purchased a content, the content is encrypted and transmitted to the device of the user A. The content key which has been used for encrypting the content is encrypted with the secret key of the user A and is transmitted to the user device (PC) 10a which the user A owns. At this time, due to the user device (PC) 10a being correlated with the user A, the user device (PC) 10a can obtain the secret information of the user A included in the link information transmitted from the copyright management server 20a, and decrypt the encrypted content key.

Figure 12:
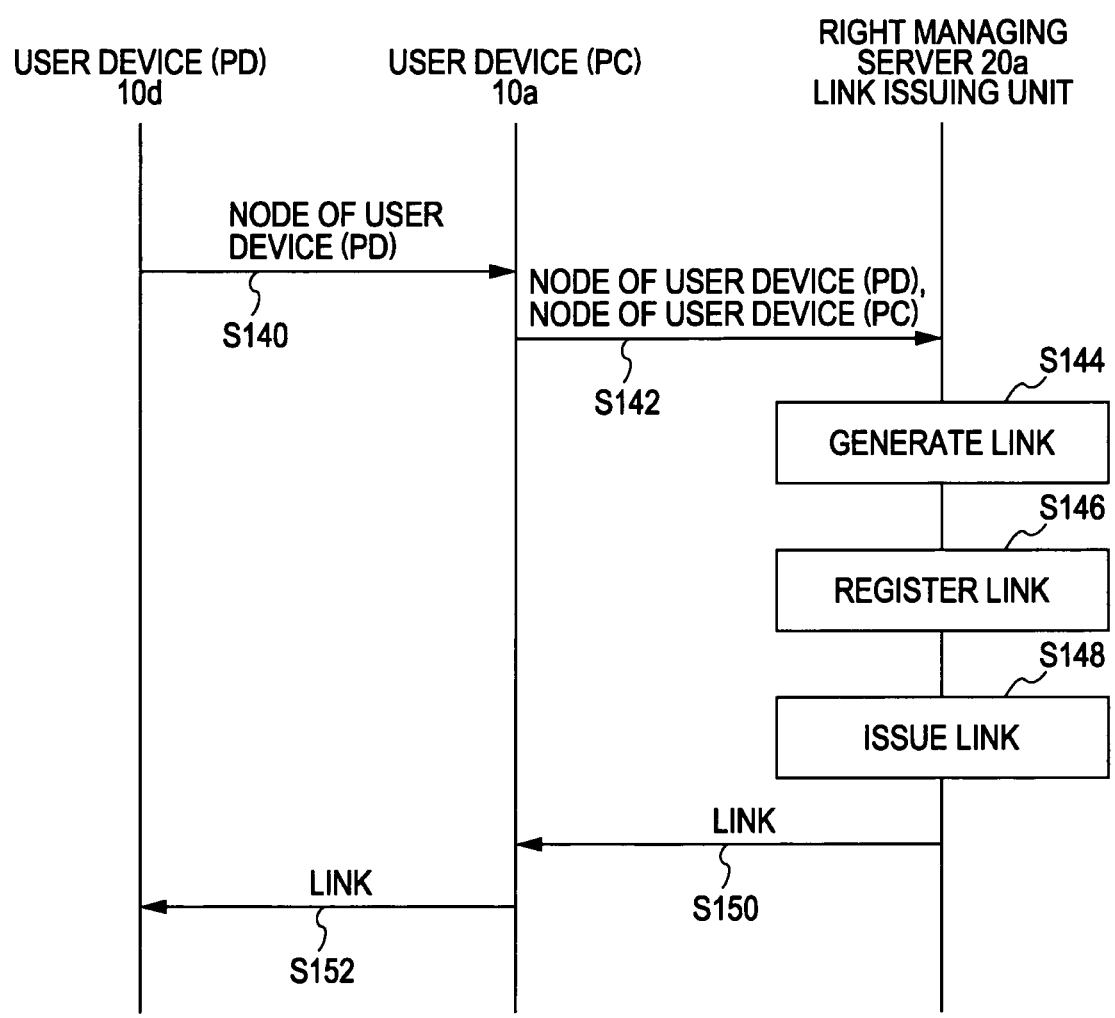
FIG. 12 is a timing chart illustrating link processing in the embodiment.

The above has been description of correlation of the user device (PC) 10a connected to the network and the user A. Next, correlation between the user device (PD) 10d not connected to the network and the user device (PC) 10a will be described with reference to FIG. 12.

First, the user device (PC) 10a obtains the node information of the user device (PD) 10d connected to the user device (PC) 10a (S140). The user device (PC) 10a which has obtained the node information of the user device (PD) 10d in step S140 transmits the node information of the user device (PD) 10d and its own node information to the copyright management server 20a (S142). An arrangement may be made wherein the direction of correlation is also transmitted in step S142, along with the information of the two nodes.

The copyright management server 20a which has received the node information of the user device and the direction of correlation in step S142 generates a link based on the received information (S144). As described above, the link information generated in step S144 includes node information of the user device (PD) 10d, node information of the user device (PC) 10a, and information of the direction of correlation.

The link information generated in step S144 is correlated with the device ID of the user device (PD) 10d and stored in the user information storage unit 312 (S146). The link issuing unit 308 then issues link information containing the node information of the user device (PD) 10d, node information of the user device (PC) 10a, and information of the direction of correlation (S148), and transmits this from the transmitting unit to the user device (PC) 10a (S150).

The user device (PC) 10a which has received the link information from the copyright management server 20a in step S150 provides the link information to the user device (PD) 10d (S152). As described above, the link information includes information that the user device (PD) 10d has been correlated to the user device (PC) 10a. That is to say, the node information of the user device (PD) 10d is set to the "From" in the link, and the node information of the user device (PC) 10a is set to the "To".

Also, the link information includes key information wherein the secret key of the user device (PC) 10a stored in the user information storage unit has been encrypted with the public key of the user device (PD) 10d. The user device (PD) 10d can obtain the information of the secret key of the user device (PC) 10a by obtaining the link information.

Further, an arrangement may be made wherein the link information of the user device (PC) 10a serving as the link target of the user device (PD) 10d is transmitted at the time of issuing a link in step S148. In the event that the user device (PC) 10a is correlated with the user A, link information correlating the user device (PC) 10a and the user A is also transmitted to the user device (PD) 10d. This enables the user device (PD) 10d which has obtained the information of the secret key of the user device (PC) 10a to also obtain information of the secret key of the user device A using the information of the secret key of the user device (PC) 10a.

Figure 13:
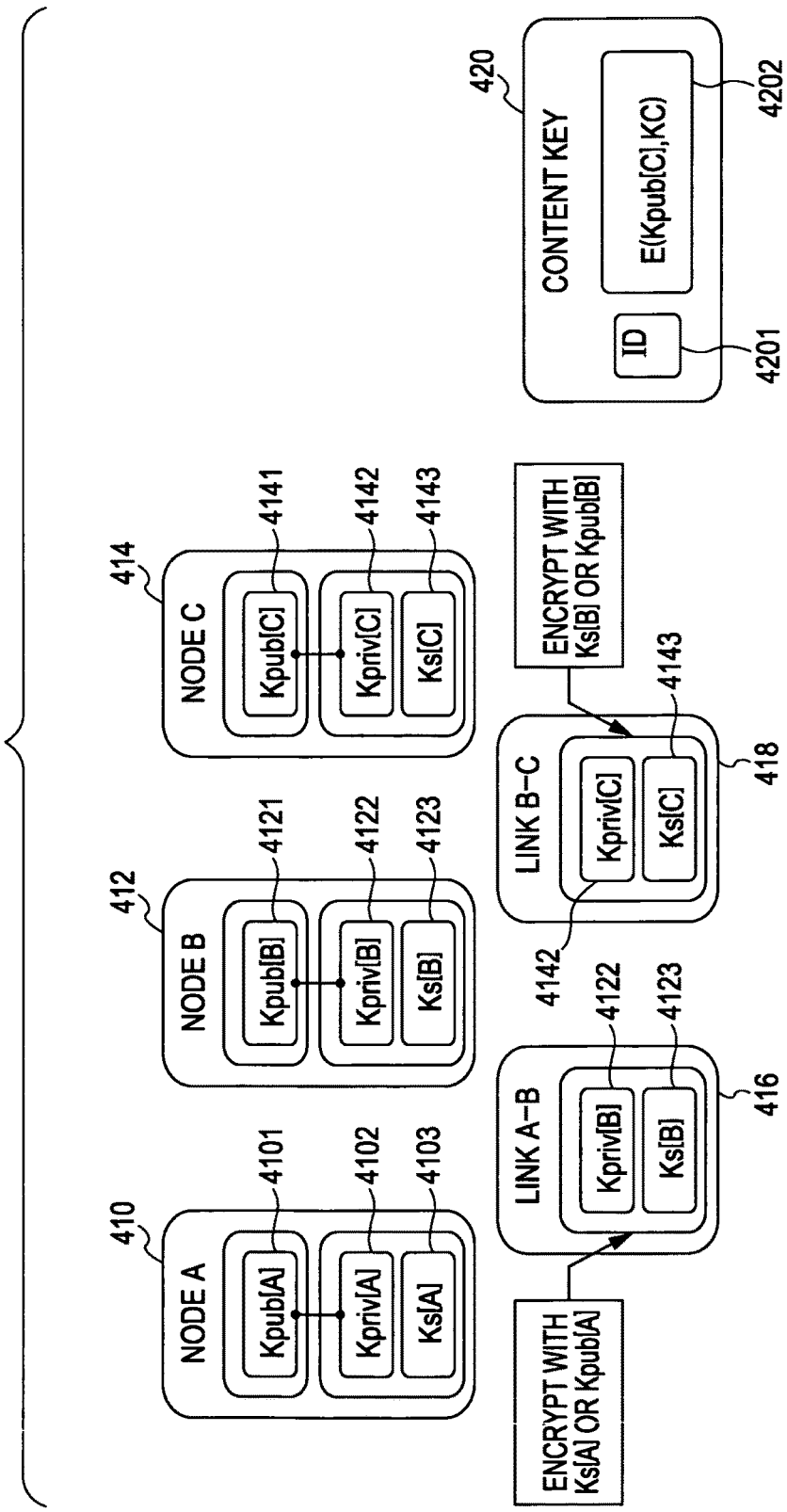
FIG. 13 is an explanatory diagram illustrating key information included in a link in the embodiment.

Key information included in a link will be described with reference to FIG. 13. FIG. 13 is an explanatory diagram for describing key information included in a link.

As illustrated in FIG. 13, we will say that three nodes, node A, node B, and node C, are stored in the user information storage unit of the copyright management server 20a. As described above, node information including the respective identification information, key information etc., are assigned to the user devices and users. Also, secret keys, public keys, shared keys, etc., are issued to the users and user devices.

To describe the key information included in the nodes, the node A includes the public key of the node A, (Kpub[A]) 4101, the secret key thereof (Kpriv[A]) 4102, and the shared key thereof (Ks[A]) 4103. In the event that encryption is to be performed by public key encryption, the public key 4101 is used for encryption, and the secret key 4102 making up a pair with the public key 4101 is used for decryption. Also, in the event that encryption is to be performed by shared key encryption, the same key is used for encryption and decryption, with encryption being performed using the shared key 4103 and decryption being performed using the shared key 4103.

The aforementioned public key encryption is a method wherein the encryption key is made public, and the decryption key is kept secret. For example, the public key 4101 for the node A is stored in a public key file on the network, and anyone can freely see this. On the other hand, the secret key 4102 making up a pair with the public key 4101 should be kept secret so that no one other than the key owner can obtain it.

Also, the aforementioned shared key encryption is a method wherein the sender and receiver share a common key, which is kept secret. For example, the shared key 4103 of the node A should be kept secret so that no one other than the copyright management server 20a and the node A can obtain it.

In the same way, the node B 412 includes the public key of the node B (Kpub[B]) 4121, the secret key thereof (Kpriv[B]) 4122, and the shared key thereof (Ks[B]) 4123, and the node C 414 includes the public key of the node C (Kpub[C]) 4141, the secret key thereof (Kpriv[C]) 4142, and the shared key thereof (Ks[C]) 4143.

As shown in FIG. 13, in the event of correlating the node A with the node B, a link 416 is issued. The link 416 includes the node ID of the node A, and node ID of the node B, and information of the direction of correlation between the node A and node B. As described above, in the event that the node A is correlated to the node B, the node A is the link origin, and the link target is the node B. Further, the link 416 includes information obtained by encrypting the secret information of the node B which is the secret key 4122 and the shared key 4123 with the public key 4101 or shared key 4103 of the node A.

The node A which has obtained the link 416 can know which node it has been correlated with, and also obtaining the secret information of the correlated link target. The secret information of the node B included in the link 416 is encrypted with the public key 4101 or the shared key 4103 of the node A, and accordingly cannot be decrypted except by the secret key 4102 or the shared key 4103 kept secret by the node A. That is to say, the key information included in the link 416 cannot be decrypted even if obtained by one other than the node A.

In the same way, the link 418 includes the node ID of the node B, and node ID of the node C, and information of the direction of correlation between the node B and node C. The direction of correlation included in the link 418 is the direction from the node B toward the node C, so the link origin is the node B and the link target is the node C. Also, the link 418 includes information obtained by encrypting secret information of the node C with the public key 4122 or shared key 4123 of the node B. The node B can obtaining the secret key 4142 or shared key 4143 of the node C from the link 418.

For example, let us say that the node C is information assigned to the user at the time of purchasing a content. The user who has purchased the content transmits the node C to the copyright management server 20*a*. The copyright management server 20*a* which has received the node C which is the node of the user encrypts the content key (KC) used for encrypting the content purchased by the user, with the public key (Kpub[C]) of the node C, which is the public key of the user. The content key 420 encrypted with the public key 4141 of the node C is transmitted to the user device (PC) owned by the user.

In the event that the node B has been assigned to the user device (PC) owned by the user, the content encrypted with the content key cannot be played on the user device (PC) unless the content key encrypted with the public key of the node C can be decrypted with the secret key of the node B. However, the node B can obtaining the secret information of the node C based on the information of the link 418 issued to the node B. Once the user device (PC) to which the node B has been assigned can obtain the secret information of the user to which the node C has been assigned, the content key 420 can be decrypted using the secret key of the user included in the secret information, and accordingly the content encrypted with the content key 420 can be decrypted.

In the same way, in the event that the node A is assigned to the user device (PD) connected to the user device (PC), the user device (PD) can decrypt the secret information of the node B encrypted with its own key. Further, the user device (PD) can decrypt the secret information of the node C included in the link 418 with the secret key of the node B included in the link 416. The user device (PD) which has obtained the secret key of the node C and has been assigned the node A can decrypt the content key 420 encrypted with the public key of the node C, and decrypt the content encrypted with the content key 420.

While FIG. 13 shows the node A being correlated with the node B, and the node B correlated with the node C, the node A may be directly correlated with the node C. In this case, the link information issued to the node A has the node ID of the node A set as the link origin, and the node ID of the node C set as the link target. Also, key information obtained by the secret information of the node C having been encrypted with the public key of the node A is included.

In order for the user who has purchased the content to play the content in a user device which the user owns, the user device needs to have obtained information of the user key which was used to encrypt the content key. Each user device obtains the user key with which the content key has been encrypted, based on the link information issued to itself, and thereby decrypts the content key.

Thus, by encrypting the content key used for encrypting the content with the public key of a user, and transmitting this to the user device which the user owns, the encrypted content can be decrypted and played at the user device correlated with the user. The content key for encrypting the content does not have to be encrypted with a unique key for each user device used for playing, since the content key can be decrypted by obtaining key information wherein the content key has been encrypted, based on the link information. The user device can know from the link information which user it has been correlated with. That is to say, the user device can know which user's secret information can be obtained, based on the link information.

The above has been description of key information included in a link. Next, licenses issued at the copyright management server 20*a* will be described with reference to FIG. 14.

7. About Licenses

Figure 14:
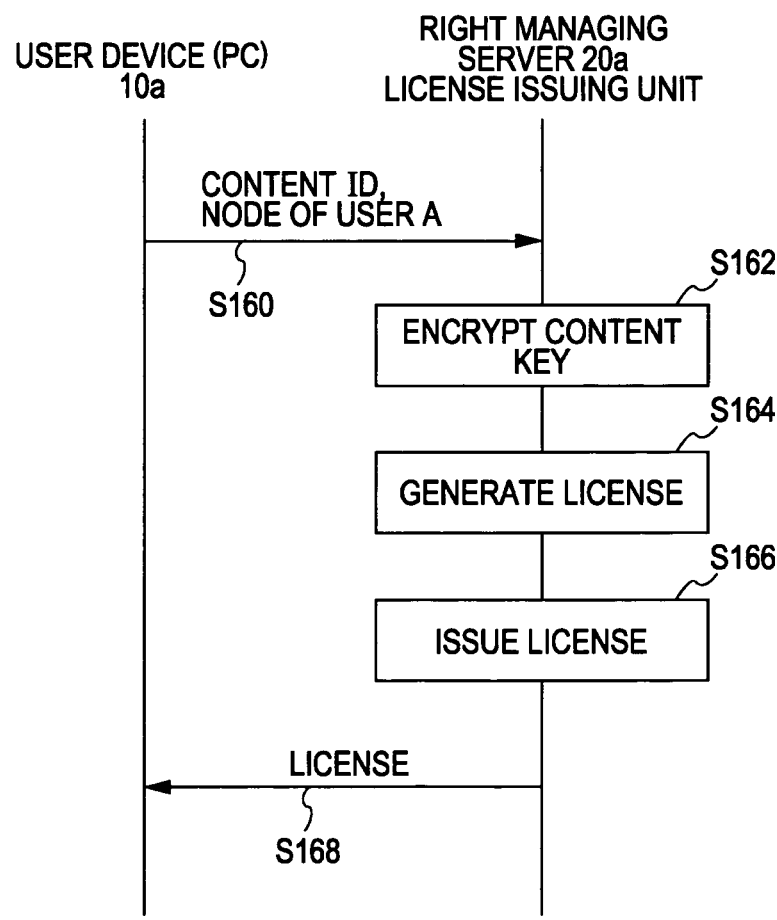
FIG. 14 is a timing chart illustrating license issuing processing according to the embodiment.

FIG. 14 is a timing chart for describing issuing of licenses at the copyright management server 20*a*. Licenses issued at the copyright management server 20*a* include information necessary for playing the content purchased by the user, such as the content key for decrypting the content. The content key included in the license is further encrypted by the user key or the like, and the user device or the like which has obtained the license can know which user key the content key has been encrypted with, based on the information included in the license. The user device or the like which has obtained the license can play the content encrypted with the content key by decrypting the content key based on the above-described link information and the like.

The user device (PC) 10*a* transmits a content ID uniquely identifying the content, and node information of the user A, to the copyright management server 20*a*, in order to obtain license necessary for playing the content (S160). As described above, if the user device owned by the user A is correlated to the user A, the license issued to the user A can also be used by another user device correlated with the user A.

The copyright management server 20*a* which has received the content ID and the node information of the user A in step S160 encrypts the content key used for encrypting the content with the public key of the user A (S162). The copyright management server 20*a* then generates a license including the content key encrypted in step S162 (S164).

Figure 15:
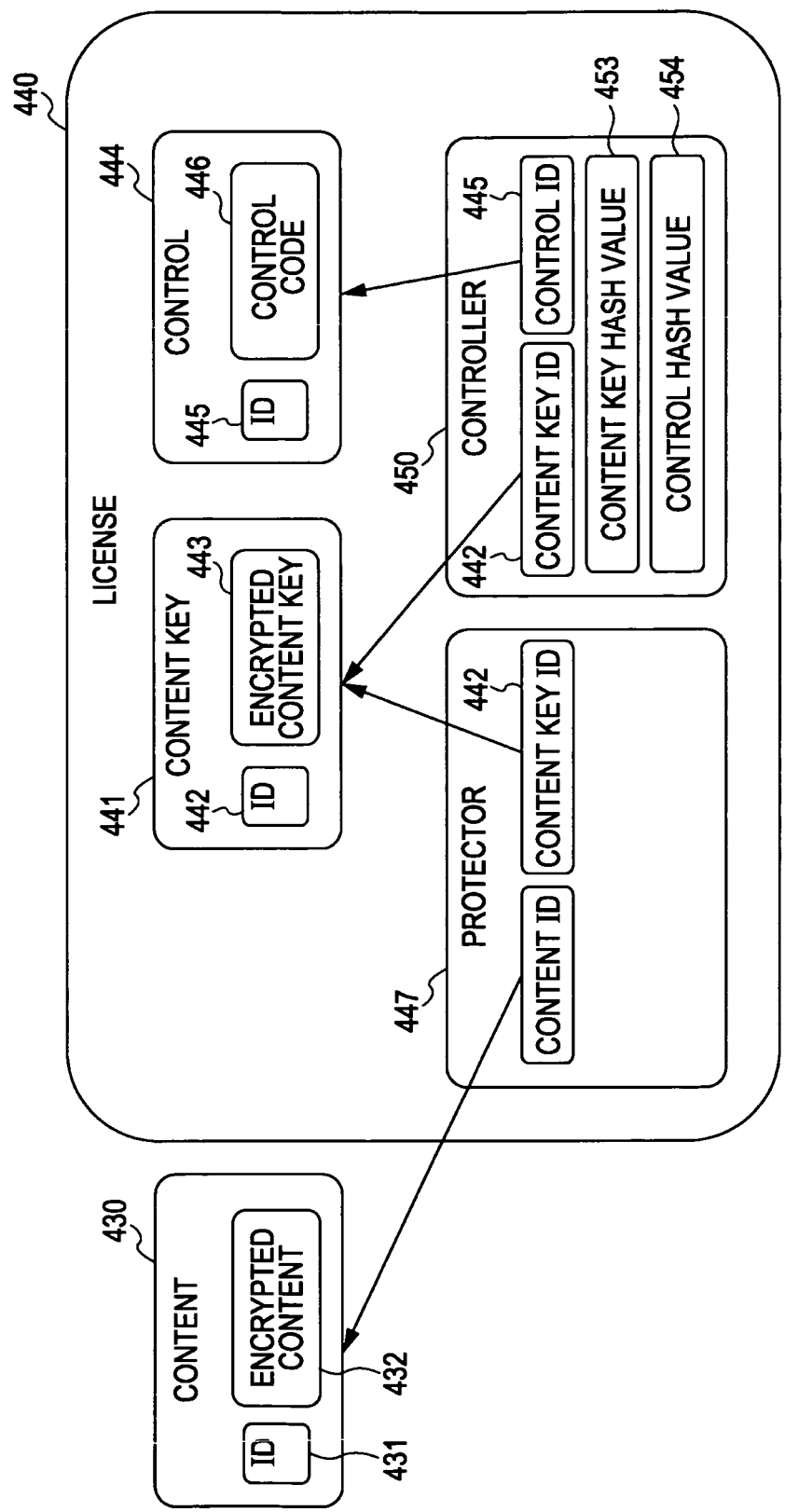
FIG. 15 is an explanatory diagram illustrating the contents of license information in the embodiment.

The license generated in step S164 will be described with reference to FIG. 15. As shown in FIG. 15, the license 440 includes a content key 441, control 444, protector 447, controller 450, and so forth. Also, the content 430 has been encrypted by the content key included in the license, and is transmitted from the content providing server 20*b*.

The content key 441 included in the license 440 has been encrypted by the key included in the node information transmitted from the user device (PC) 10*a*. For example, in the event that the node information of the user A has been transmitted from the user device (PC), the content key is encrypted with the public key of the user A. The protector 447 includes the content ID which is the identification information of the content, and the content key ID which is the identification information of the content key. The information included in the protector 447 shows which content the license 440 is to be used to play.

The control 444 includes a control code 446 which is content usage conditions and the like. The control code 446 includes play expiration date and the like of the content which the user has purchased, and the user uses the content within the range of usage conditions described in the control code. Further, the control code 446 may include information indicating which node the license 440 has been issued to.

The user device which has obtained the license 440 can determine which node the license 440 has been issued to, by referencing the control 444. In the event that the determination shows that the license has been issued to a user correlated with this user device, the user device can use that license to play the content.

The controller 450 is information associating the content key 441 and the control 444, including identification information of the content key 441 and identification information of the control 444. Also, this may include a hash value 453 of the content key 441 and a has value 454 of the control 444, to determine whether there has been any tampering with the content key 441 and the control 444. For example, in the event that the content key 441 included in the license 440 has been tampered with at the time of transmitting from the copyright management server 20a to a user device or the like, the hash value obtained from the content key 441 and the hash value included in the controller assume different values, whereby the content key 441 can be judged to have been tampered with. Determination of tampering can be made for the control 444 with the control hash value 454 in the same way, thereby enabling rewriting of content usage conditions and the like at the time of transmitting the license. The above has been a description of licenses.

Returning to FIG. 14, the license generated in step S164 is issued to the user device (PC) 10a (S166), and transmitted to the user device (PC) 10a (S168).

The user device (PC) 10a which has received the license in step S168 decrypts the content key encrypted with the user key of the user owning the user device (PC) 10a, using the key information included in the link. The content encrypted with the content key can then be decrypted with the decrypted content key and played at the user device (PC) 10a.

The above has been description of issuing licenses. Next, the concept of "key ring" which a user device has will be described with reference to FIG. 16. Each user device has a key ring necessary for decrypting content keys, and decrypts content keys encrypted using the key ring.

Figure 16:
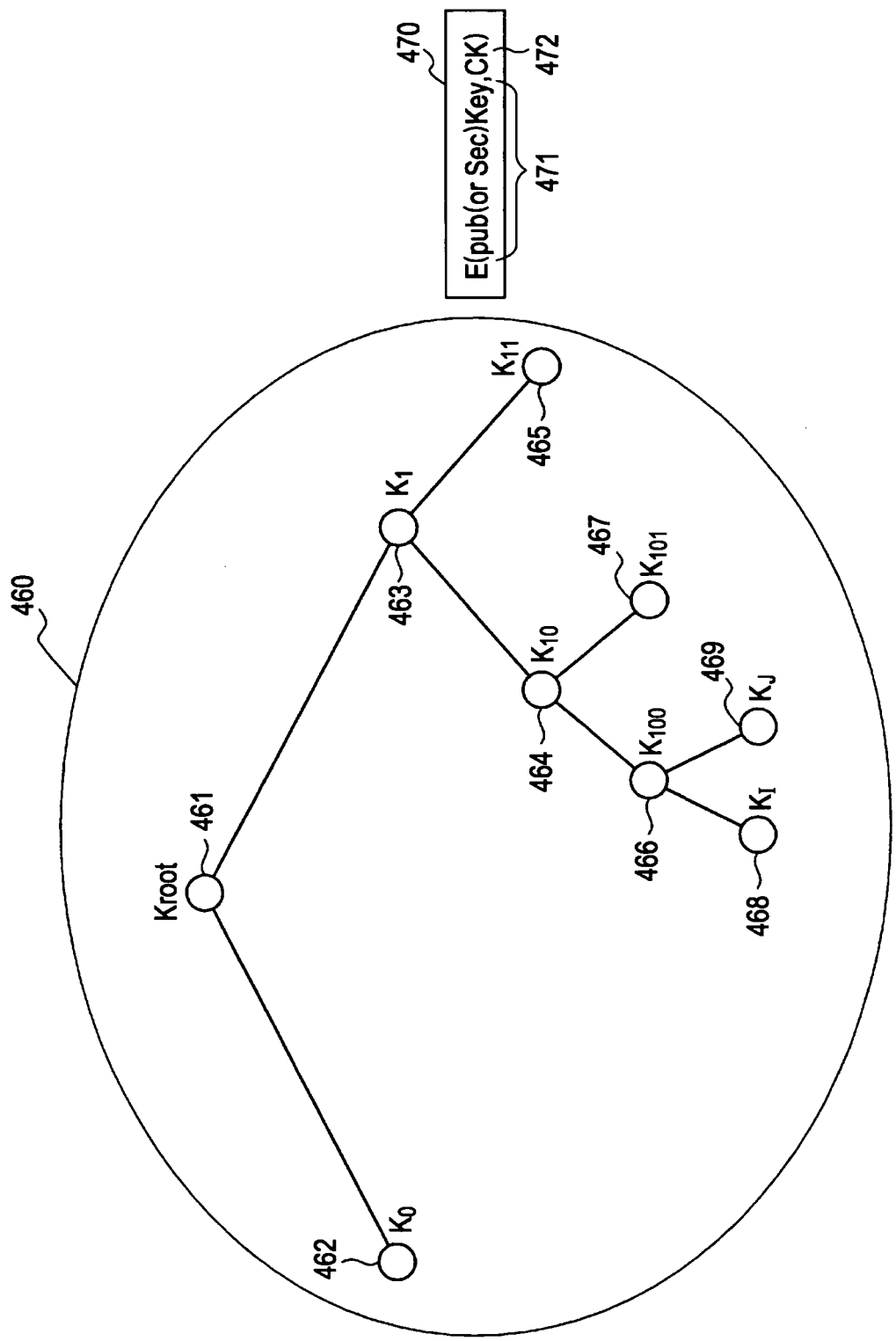
FIG. 16 is an explanatory diagram illustrating the concept of key information in the embodiment.

FIG. 16 is a conceptual diagram of key management according to the present embodiment. As indicted by reference numeral 460, a tree structure concept is employed with the present embodiment. That is to say, a Kroot key 461 is at the apex, and node keys are assigned to each node, such as K0 key 462, K1 key 463, K10 key 464, K11 key 465, and so on. At the lowest level are assigned user keys unique to user device I and J, in the form of KI key 468, KJ key 469, and so forth. Now, let us say that each node key is encrypted by the node key immediately below it on the tree structure. For example, the KI key 463 is encrypted with the K10 key 464 or the K11 key 465. On the other hand, a pub (or Sec) key 471 is equivalent to the Kroot key 461. That is to say, the content key 472 is encrypted by the Kroot key 461. In FIG. 13, the content key is encrypted by the public key of the node C, but more specifically, the content key is encrypted by the Kroot key 461. For example, in this case, in order for the user device I to obtain the content key 472 to encrypt the content, a key ring configured of the KI key, E(KI key, K100 key), E(K100 key, K10 key), E(K10 key, K1 key), E(K1 key, Kroot key), E (pub(or Sec)key, CK) is necessary. This key ring is included in the content body.

In this way, the user devices which the user owns each can use key rings which they have to obtain the Kroot key 461 and decrypt the content key 472.

The above has been a description of the copyright management method used with the content providing system 500. Next, the overall configuration of the content providing system 500 will be described with reference to FIG. 17.

8. Overall Configuration of Content Providing System 500

Figure 17:
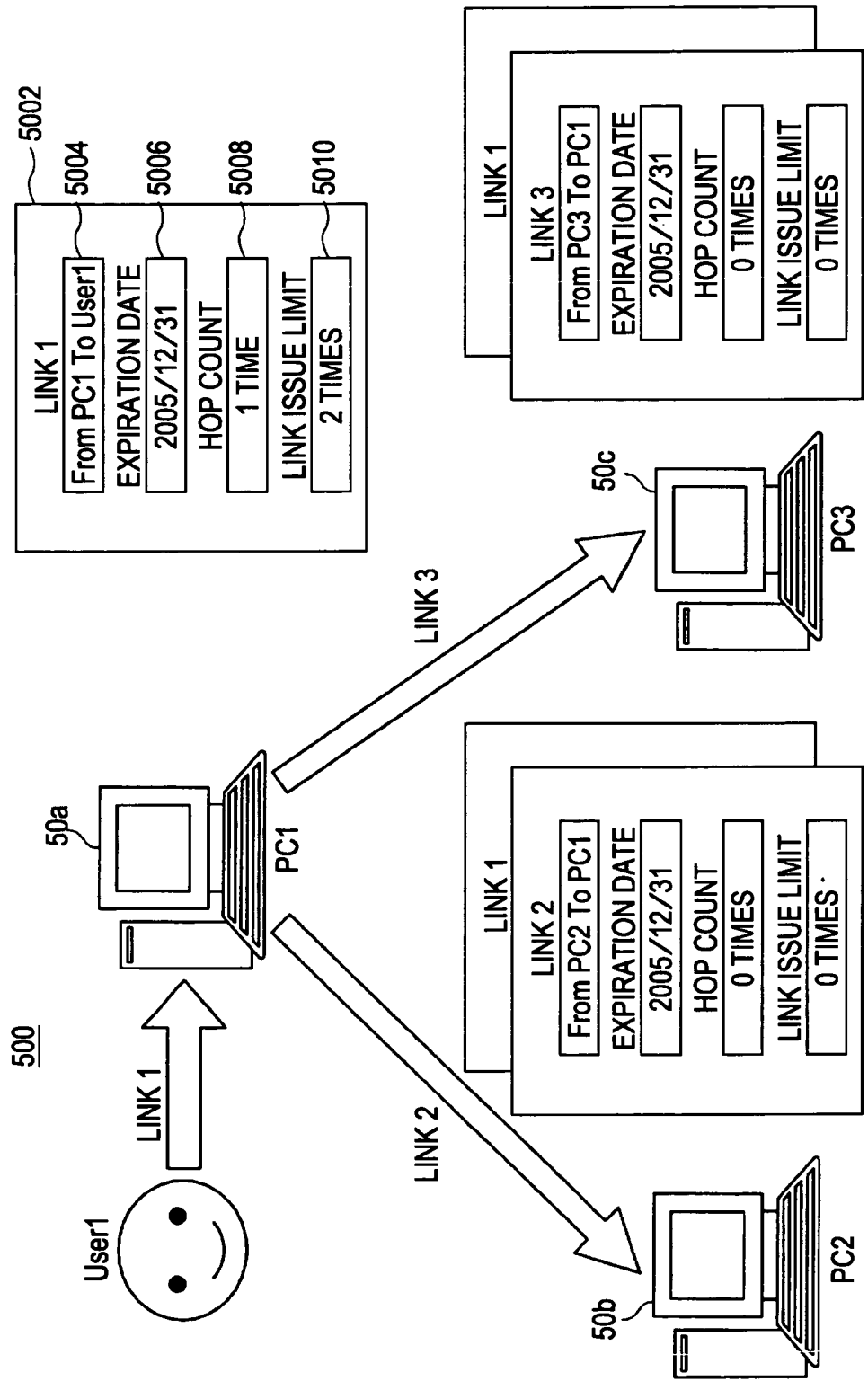
FIG. 17 is a block diagram illustrating the overall configuration of the content providing system according to the embodiment.

As shown in FIG. 17, the content providing system 500 according to the present embodiment includes a content playing device 50a (PC1) serving as a content providing source, and content playing devices 50b (PC2) and 50c (PC3) which use content held in the content playing device 50a. Note that in the present embodiment, the content providing source is the user using the content playing device 50a, and that the copyright management server (unshown) has issued, to the content playing device 50a, link information (link 1) correlating the identification information of the content playing device 50a with the user. Accordingly, while the content issuing source is the user, the content playing device 50a will also be called the content providing source device in the following description for sake of facilitating description.

The content playing devices 50a, 50b, and 50c are computers which decrypt contents encrypted with a content key, and play the contents. Examples of the content playing devices 50a, 50b, and 50c include personal computers, PDAs (Personal Digital Assistants), PDs (portable devices) which are portable content player devices, and so forth. A more specific example of a PD is a portable audio player which has a hard disk drive (HDD) with a capacity in the order of tens of gigabytes. This also includes portable video/audio players, cellular phones, Personal Handyphone System devices, and other like portable devices.

The content playing device 50a has been issued a LINK 1 which is link information correlating with the user ID of a USER 1 using the content playing device 50a, from the copyright management server 20a described above in the linked copyright management method, and can play the contents corresponding to the license issued to the USER 1. Also, the content playing device 50a can generate a LINK 2 which is link information correlating a content playing device 50b with the content playing device 50a so as to share content, which the content playing device 50a can play, with the content playing device 50b, and issue the LINK 1 and LINK 2 to the content playing device 50b. At the same time, the content playing device 50a can generate a LINK 3 which is link information correlating the content playing device 50c with the content playing device 50a so as to share content, which the content playing device 50a can play, with the content playing device 50c, and issue the LINK 1 and LINK 3 to the content playing device 50c. The content playing device 50b and the content playing device 50c can play contents corresponding to licenses issued to the USER 1 by tracing the link information issued from the content playing device 50a.

As described above, the link information includes node information, the direction of correlation between the nodes, and information obtained by encrypting a unique key (secret key) of the node set to the link target (To) in the correlation direction with a unique key (public key) of the node set to the link origin (From). Further, with the content processing system 500, link information includes usage restriction information for restricting usage of the link information. Usage of link information in the content providing system 500 includes obtaining the user key with which the content key has been encrypted by tracing link information to play the content, and generating link information correlating itself with other content playing devices so as to issue to other content playing devices not only the generated link information but also link information necessary for obtaining the user key. Usage restriction information will be described in detail with reference to the example illustrated in FIG. 17.

The link information 5002 according to the present embodiment includes, as examples of usage restriction information, expiration date information 5006, hop count information 5008, and link issue limit 5010 which is the number of times that a link can be issued. The expiration date information 5006 is information for restricting the time period over which the link information 5002 can be used. Note that the expiration data information 5006 is an example of decryption restriction information, and also is an example of transfer restriction information. At the time of using link information, the content playing device refers to the expiration date information 5006. In the event that the current date is not beyond the expiration date, the content playing device can use the link information to obtain the user key by tracing the link information, decrypt the content key using the user key, and play the content. On the other hand, in the event that the current date is beyond the expiration date, the content playing-device can no longer use the link information, and accordingly cannot use the user key or device keys interposed therebetween, and consequently cannot play the content. Also, the content playing device is restricted regarding issuing link information by the later-described hop count information 5008 and link issuing limit 5010, and further, issuing of link information is also restricted by the expiration date information 5006. Even in the event that issuing of link information is permitted by the hop count information 5008 and link issuing limit 5010, the content playing device cannot issue link information to other content playing devices in the event that the current date is beyond the expiration date. The content playing device includes expiration date information 5006 in the link information being issued, and the setting value for this may be the same value as that included the link information which the content playing device uses itself, or may be a different value.

Specifically, looking at the LINK 1 issued by the content playing device 50a in the drawing for example, the expiration date 5006 is set to "2005/12/31". This means that the content playing device 50a can use the LINK 1 up to Dec. 31 of 2005 to play contents and issue link information. The expiration date 5006 is set for the links which the content playing device 50a has issued as well, and the setting values in the example in the drawing are also "2005/12/31" for LINK 2 and LINK 3, as with LINK 1. This means that the content playing device 50b and content playing device 50c can use the LINK 2 and LINK 3, respectively, up to Dec. 31 of 2005 to play contents and issue link information.

Note that the setting values of the expiration date information 5006 of the LINK 2 and LINK 3 may be set to values other than those of the LINK 1, such as "2005/11/30", for example. An arrangement may be made wherein the content playing device 50a, which is the issuing source of the LINK 2 and LINK 3, can freely determine the setting values, or an arrangement may be made wherein the link information contains rules regarding the setting values, with the content playing device 50a setting values based on those rules. For example, a rule may be set in the base link information which stipulates that the expiration date set in the link information which the content playing device 50a issues must be one month earlier than the expiration date set in the base link information, in which case the content playing device 50a would calculate the expiration date based on that rule at the time of issuing link information, and accordingly set the value.

The hop count information 5008 and link issue limit 5010 are examples of transfer restriction information, and also are examples of information restricting issuing link information. Restricting issuing of link information restricts transfer of the user key and device key. The hop count information 5008 is information restricting how many generations the link information can be issued. Specifically, in the LINK 1 which is information issued to the content playing device 50a as shown in the example in the drawing, "1" is set for the hop count information 2008. This means that the content playing device 50a can issue link information for one generation, and accordingly the content playing device 50a can issue link information to the content playing device 50b and the content playing device 50c. At the time of issuing the link information, the content playing device 50a includes in the link information being issued usage restriction information. A "0" is set in the hop count information 5008 included in the link information (LINK 2 and LINK 3) issued by the content playing device 50a. The content playing device 50a is only permitted to issue link information for one generation in the LINK 1 as described above, and accordingly cannot permit the content playing device 50b and the content playing device 50c to issue link information. Due to the hop count information for the LINK 2 and LINK 3 being set to "0", the content playing device 50b and the content playing device 50c using the LINK 2 and LINK 3 cannot issue link information to other content playing devices.

In the event that "2" has been set to the hop count information in the LINK 1, "1" is set to the hop count information in LINK 2 and LINK 3, so the content playing device 50b and the content playing device 50c to which the LINK 2 or LINK 3 is issued can further issue link information to other content playing devices. In this case, the hop count information in the link information which the content playing device 50b or content playing device 50c issues to other content playing devices will be set to "0". Thus, content playing devices to which link information has been issued are restricted regarding issuing of link information, based on the usage restriction information included in the link information. Also, the content playing device can generate new usage restriction information based on the usage restriction information in the link information which it uses itself, and include the generated usage restriction information in the link information to be issued.

Including the hop count information in the usage restriction information enables an acquirer who has validly acquired a content from a service provider to provide the acquired content to another user (e.g., a friend) so as to share the content, but prevents the content from leaking out beyond that to other users (e.g., a friend of the friend who has been provided with the content). Accordingly, the service provider allows an acquirer who has validly acquired a content to perform distribution of the content and sharing thereof with other users within a certain range, while at the same time not being robbed of opportunity of new sales of the content, and the copyright of the content can be protected.

The link issue limit 5010, which is another example of information restricting issuing of link information, is information for restricting the number of times that link information can be issued. The content playing device is permitted to issue link information to other content playing devices only within the number of times set in the link issue limit 5010. Specifically, in the LINK 1 which is link information issued to the content playing device 50a as shown in the drawing for example, the link issue limit 5010 is set to "2". This means that the content playing device 50a is permitted to issue link information up to two times, so the content playing device 50a first issues the LINK 2 to the content playing device 50b. Each time of the content playing device 50a issues link information, the value of the link issue limit 5010 in the LINK 1 which is link information used by the content playing device 50a itself is decremented. This means that following issuing the LINK 2, "1" is set to the link issue limit 5010 in LINK 1, and accordingly the content playing device 50a is permitted to issue link information just one more time. Subsequently, upon the content playing device 50a issuing link information to the content playing device 50c, i.e., following issuing the LINK 3, "0" is set to the link issue limit 5010 in LINK 1, and accordingly the content playing device 50a no longer is permitted to issue link information. On the other hand, "0" has been set to the hop count information 5008 in LINK 2 and LINK 3, so the link issue limit 5010 is also set to "0". Note that in the event that the hop count information 5008 in LINK 2 and LINK 3 is set to other than "0", the link issue limit 5010 may be set to an arbitrary value determined by the content playing device 50a which is the issuing source of the LINK 2 and LINK 3, or may be set the same value as that of the content playing device 50a which is the issuing source of the LINK 2 and LINK 3 ("2" in the example shown in the drawing). Further, an arrangement may be made wherein rules regarding the setting values are included in the link information in the same way as with the expiration date information 5006, with the content playing device 50a setting values based on the rules.

Including the link issue limit 5010 in the link information enables an acquirer who has acquired a content from a service provider to determine the number of other users to which the acquired content can be provided. Accordingly, the service provider can enable a valid acquirer of the content to distribute and share the content with other users within a certain range, and at the same time without being robbed of opportunity of new sales of the content, and the copyright of the content can be protected.

As described above, the content playing device 50a in the content providing system 500 according to the present embodiment can generate new link information based on the link information which it has, and provide the newly generated link information to other content playing devices. At this time, usage restriction information can be newly generated based on the usage restriction information included in its own link information, and included in the link information being issued. Also, the content playing devices 50b and 50c can obtain link information from the content playing device 50a which is the content providing source thereof, and play the content based on the link information. With the content playing device according to the present embodiment, the functions of the content playing device 50a alone may be used, or the functions of the content playing devices 50b and 50c alone may be used. Further, the functions of both the content playing device 50a and the content playing devices 50a and 50b may be used. In the following description, the content playing device 50 will be described as a content playing device having the functions of both.

The above has been a description of the overall configuration of the content providing system 500. Next, the functional configuration of the content playing device 50 according to the present embodiment will be described with reference to FIG. 18.

9. Functional Configuration of Content Playing Device

Figure 18:
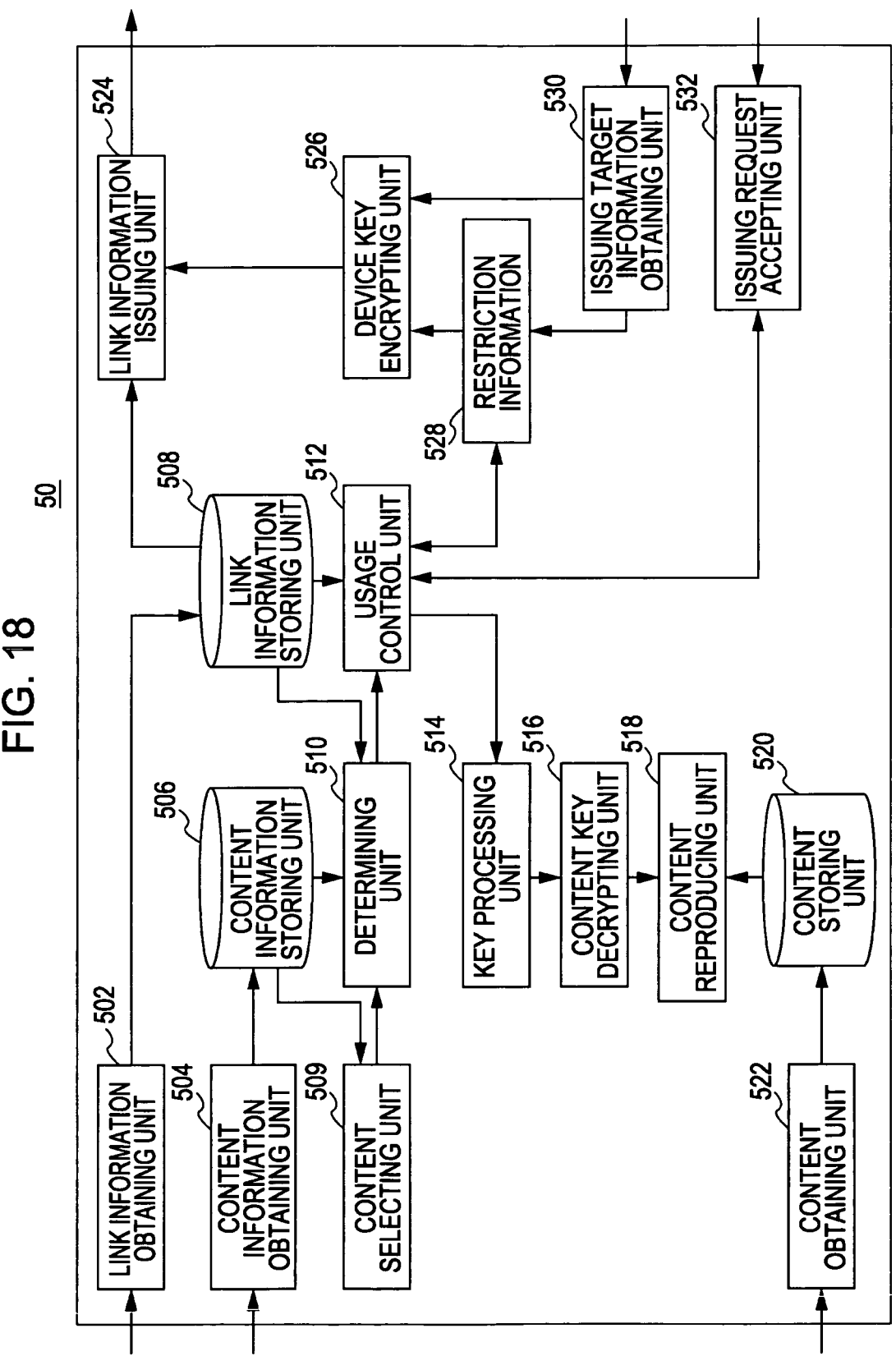
FIG. 18 is a block diagram illustrating the functional configuration of a content reproducing device according to the embodiment.

As shown in FIG. 18, the content playing device 50 includes a link information obtaining unit 502, a content information obtaining unit 504, a content information storing unit 506, a link information storing unit 508, a content selecting unit 509, a determining unit 510, a usage control unit 512, a key processing unit 514, a content key decrypting unit 516, a content reproducing unit 518, a content storing unit 520, a content obtaining unit 522, a link information issuing unit 524, a device key encrypting unit 526, a restriction information generating unit 528, an issuing target information obtaining unit 530, an issuing request accepting unit 532, and so forth. Note that the link information obtaining unit 502, content information obtaining unit 504, content information storing unit 506, link information storing unit 508, content selecting unit 509, determining unit 510, usage control unit 512, key processing unit 514, content key decrypting unit 516, content reproducing unit 518, content storing unit 520, and content obtaining unit 522 primarily have functions relating to playing contents using the link information, and that the link information issuing unit 524, device key encrypting unit 526, restriction information generating unit 528, issuing target information obtaining unit 530, and issuing request accepting unit 532 primarily have functions related to issuing link information. The link information storing unit 508 and the usage control unit 512 have functions relating to both playing content and issuing link information.

First, description will be made regarding the functions relating to playing contents. The link information obtaining unit 502 obtains link information. The link information may be obtained from the copyright management server, or from the content providing source device, for further another content playing device which has been issued link information from the content providing source device. Also, the link information may be obtained by reading from a removable recording medium such as a flexible disk or a CD (Compact Disk), not shown in FIG. 18. The link information is as described above. That is to say, the link information includes a pair of identification information of which one is a link origin and the other is a link target. The identification information is identification information which uniquely identifies the user (user ID) or identification information which uniquely identifies the content playing device (device ID) in the copyright management server. The link information also includes information obtained by a key unique to the user or content playing device identified by the identification information set in the link target (user key or device key) having been encrypted by a key unique to the user or content playing device identified by identification information set at the link origin. Also included is the usage restriction information of the link information.

The link information storing unit 508 stores link information which the link information obtaining unit 502 has obtained. By storing the link information, the link information storing unit 508 correlates the device ID of the content playing device 506 (hereafter referred to as "local device") to which the link information storing unit 508 belongs and the user ID of the user using the content providing source device. More specifically, the link information storing unit 508 realizes correlation between the local device and the content providing source by generating a path of which the starting point is the local device and the destination is the content providing source (specifically, the user using the content providing source device) in accordance with the link information stored. Once this path is generated, the content playing device 50 can trace the link information and succeed in decrypting the user key of the user who is correlated with the content providing source device, using the device key unique to the local device. Note that at the time of the copyright management server providing the content key to the content providing source device, there are cases wherein the content key is encrypted not with the user key of the user using the content providing source device but the device key of the content providing source device. In this case, that which is correlated with the device ID of the local device at the information link information storage device 508 of the content playing device 50 is the device ID of the content providing source device, so the destination reached by tracing the link information is not the user using the content providing source device but the content providing source device itself.

The content information obtaining unit 504 is an example of a content key obtaining unit, and receives content information from the copyright management server, content providing source device, or other content playing devices. Specifically, the content information obtaining unit 504 receives, via communication network, content information including the content ID, encrypted content key, user ID of the user using the content providing source device, and meta information of the content included therein such as tune titles and so forth. Also, the link information may be obtained by reading content information from a removable recording medium such as a flexible disk or a CD, not shown in FIG. 19. The content information obtaining unit 504 stores the obtained content information in the content information storing unit 506. The content information storing unit 506 stores content information, and is configured of RAM or an HDD.

The content selecting unit 509 selects content information stored in the content information storing unit 506. The content selecting unit 509 includes a display unit such as a display device for displaying meta information of the content included in the content information stored in the content information storing unit 506, and an input unit such as a mouse or keyboard for enabling the user to select desired meta data. The content selecting unit 509 provides the content ID of the content correlated with the meta information selected by the user, to the determining unit 510.

The determining unit 510 determines whether or not to permit the content key decrypting unit to decrypt the content key, based on the user ID included in the content information, and the user ID of the user using the content providing source device correlated with the local device in the link information storing unit 508. Specifically, the determining unit 510 obtains content information including a content ID, obtained from the content selecting unit 509 from the content information storing unit. The determining unit 510 compares the user ID included in the obtained content information with the user ID stored in the link information storing unit 508, and in the event that the two user IDs correspond, content key decryption by the content key decrypting unit 516 is permitted. In the event of permitting decryption processing, the determining unit 510 continues the subsequent processing of the content playing device 50 by starting the processing of the usage control unit 512. On the other hand, in the event that the two user IDs do not correspond, an error message is made to the effect of "This device does not have necessary rights to play this content", content key decryption by the content key decrypting unit 516 is forbidden, and the content playing device does not proceed to subsequent processing. Note that the term "two user IDs correspond" means that one user ID can be used to reach another user ID according to a predetermined rule, and includes cases wherein the two user IDs match.

Figure 20:
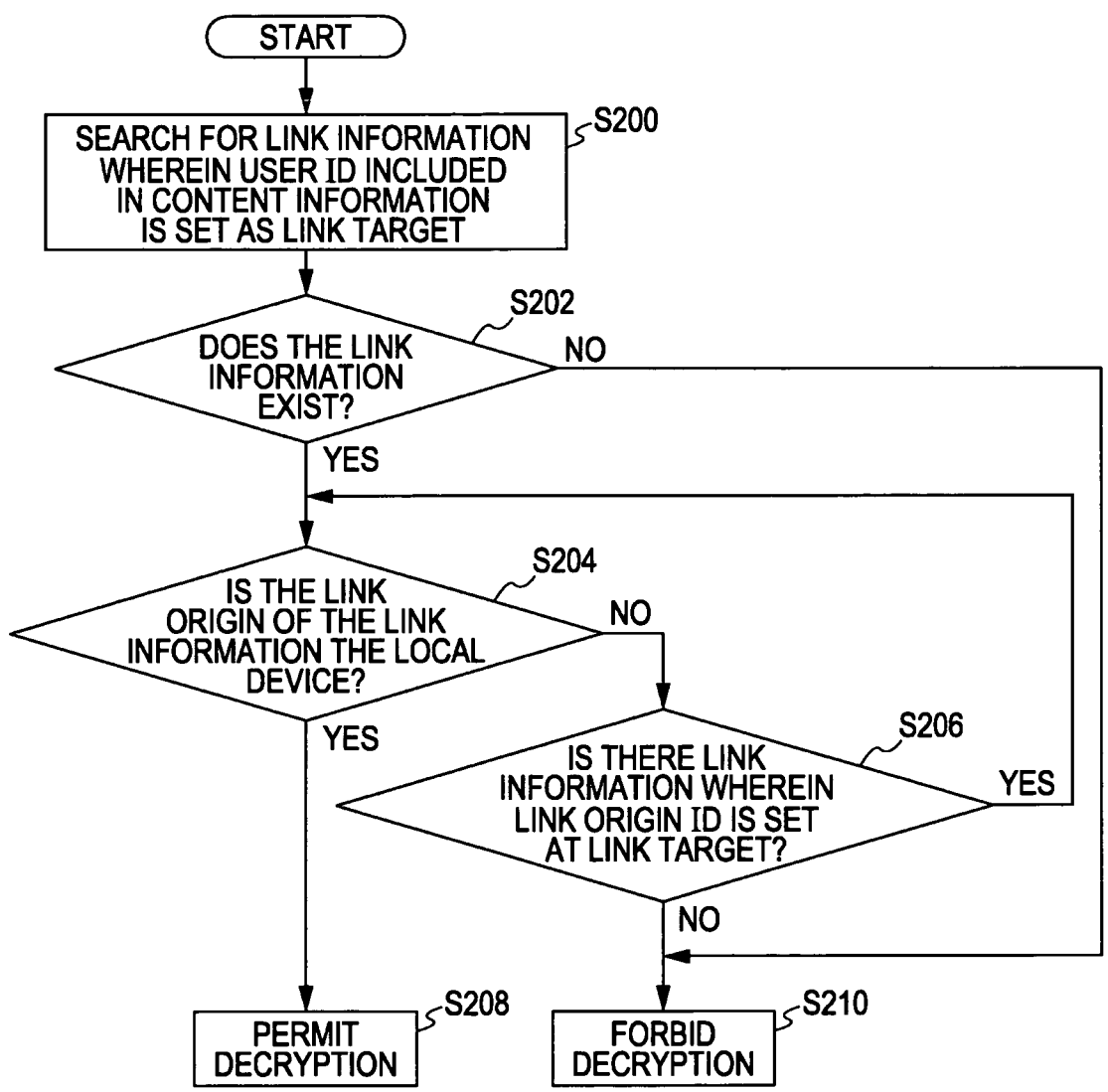
FIG. 20 is a flowchart illustrating content key decryption permission determining processing with the content reproducing device according to the embodiment.

A specific example of processing performed by the determining unit 510 will be described with reference to FIG. 20. First, the determining unit 510 checks whether the user ID included in the obtained content information is stored in the link information storing unit 508. In the event that it is stored, the determining unit 510 checks whether or not a path has been generated at the link information storing unit 508 which has the local device as the starting point and the destination thereof is the user ID, based on the link information. That is to say, the determining unit 510 searches the link information storing unit 508 for the link information (e.g., link A) of which the user ID included in the content information is set as the link target (S200).

In the event that the link information exists (S202), determination is made regarding whether or not the identification information set at the link origin of the link A is the device ID of the local device (S204). In the event that the link origin of the link A is the device ID of the local device, determination is made that a path has been generated which has the local device as the starting point and the destination thereof is the user ID, so decryption processing of the content key by the content key decrypting unit 516 is permitted (S208).

In step S204, in the even that the link source in link A is not the device ID of the local device, the determining unit 510 searches other link information (e.g., link B) of which the identification information of the link source of the link A has been set as the link target (S206). In the event that there is no corresponding link information, the determining unit 510 determines that a path which has the local device as the starting point and the destination thereof is the user ID has not been generated, so decryption processing of the content key by the content key decrypting unit 516 is not permitted (S210). On the other hand, in the event that there is corresponding link information in step S206, determination is made regarding whether or not the identification information set at the link origin of the link B is the device ID of the local device (S204).

The above processing is repeated to trace the link information, and in the event that the link information where the device ID of the local device is set in the link origin has been stored in the link information storing unit 508, the determining unit 510 permits decryption processing of the content key by the content key decrypting unit 516.

In the event of permitting decryption processing of the content key, the determining unit 510 provides the usage control unit 512 with link information for generating a path from the local device to the user ID (e.g., link A, link B, link C), which has been identified with the above processing, and content information obtained from the content information storing unit 506.

The usage control unit 512 controls usage of link information, based on the usage restriction information stored in the information storing unit 508. Specifically, the usage control unit 512 obtains, from the determining unit 510, link information for generating a path from the local device to the user ID (e.g., link A, link B, link C), and content information. The usage control unit 512 then makes reference to the usage restriction information included in the link information (link C) where the device ID of the local device has been set as the link origin, to determine whether usage of the information is permissible. More specifically, the usage control unit 512 makes reference to the expiration date information included in the usage restriction information, compares the date and time therein with the current date and time, and determines whether the current date and time is within the expiration date and time. In the event that the current date and time is within the expiration date and time, the usage control unit 512 provides the key processing unit 514 with the link information (e.g., link A, link B, link C) and content information obtained from the determining unit 510, and the content playing device 50 continues the subsequent processing. On the other hand, in the event that that the current date and time is beyond the expiration date and time, an error display is made to the effect that "The content cannot be played because the expiration date has passed", and subsequent processing is not performed.

The key processing unit 514 decrypts the user key of the user using the content providing source device, based on the link information stored in the information storing unit 508. Specifically, the key processing unit 514 obtains link information from the usage control unit 512, and first decrypts the encrypted information (key) included in the link information (e.g., link C) where the link origin is the local device, using the device key unique to the local device. Next, the key processing unit 514 decrypts the encrypted information (key) included in the link information (e.g., link B) where the link origin is the identification information set to the link target in link C, using the key decrypted immediately before. The key processing unit 514 repeats this processing to decrypt encrypted information included in the link information (e.g., link A) where the user ID is set to the link target, i.e., decrypts the user key encrypted with the link origin key of the link A. Subsequently, the key processing unit 514 provides the decrypted user key and the content information obtained from the usage control unit 512 to the content key decrypting unit 516.

The content key decrypting unit 516 obtains the content information and user key from the key processing unit 514, and decrypts the content key included in the obtained content information using the obtained user key. The content key decrypting unit 516 provides the content playing unit 518 with the content ID included in the content information, and the decrypted content key.

The content playing unit 518 obtains the content ID and content key from the content key decrypting-unit 516, obtains the content identified by the obtained content ID from the content storing unit 520, and decrypts the content with the content key and plays the content.

The content obtaining unit 522 obtains the content from the content provider server, content providing source device, other content playing devices, or the like, and stores the content in the content storage unit 520. Also, the content may be obtained by reading from a removable recording medium such as a flexible disk or a CD.

Figure 19:
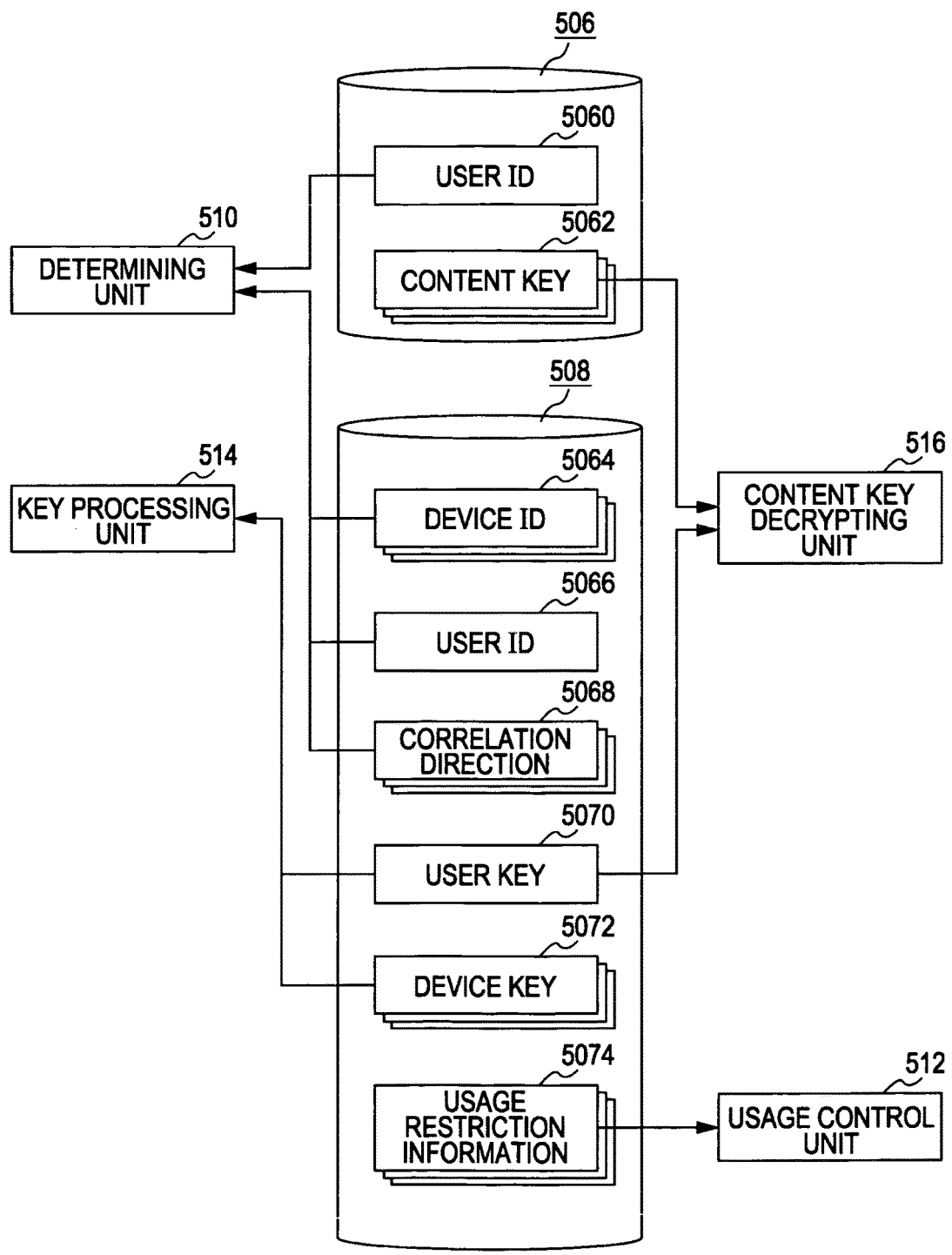
FIG. 19 is a block diagram illustrating detailed functional configuration of the content reproducing device according to the embodiment.

Next, a brief description will be given regarding which information the processing units relating to playing of contents use to perform various processing, with reference to FIG. 19.

With the content playing device 50, information relating to playing of the content is stored in the content information storing unit 506 and the link information storing unit 508. The content information storing unit 506 stores one or multiple content information sets, each set being made up of at least user ID 5060, content key 5062, and content ID (not shown).

The link information storing unit 508 stores link information as described above, and more specifically stores at least one device ID 5064, user ID 5066, direction of correlation 5068, user key 5070, and at least one device key 5072, each associated with link information. Note that the direction of correlation 5068 indicates the link origin and link target included in each link information. Also, the link information storing unit 508 also stores usage restriction information 5074. Each link information includes usage restriction information, so in the event that multiple sets of link information are stored, the link information storing unit 508 stores multiple sets of usage restriction information. The usage restriction information which the usage control unit 512 refers to in order to perform usage control of link information is the usage restriction information included in the link information wherein the device ID of the local device has been set as the link origin.

The determining unit 510 uses the user ID 5060 stored in the content information storing unit 506, and the device ID 5064, user ID 5066, and direction of correlation 5068, stored in the link information storing unit 508, to perform the above-described determining processing.

The key processing unit 514 performs the above-described user key decryption processing using the user key 5070 and device key 5072 stored in the link information storing unit 508.

The content key decryption unit 516 performs the above-described content key decryption processing using the content key 5062 stored in the content information storing unit 506 and the user key 5070 stored in the link information storing unit 508.

The usage control unit 512 performs the above-described usage control processing using the device ID 5064 and usage restriction information 5074 stored in the link information storing unit 508.

The above has been a description of functions relating to playing content. Next, description will be made regarding functions related to issuing link information.

The issuing request accepting unit 532 receives a request for issuing link information from another content playing device, and inquires of the usage control unit 512 regarding whether or not link information can be issued. In the event that issuing of the link information is permissible as the result of making the inquiry to the usage control unit 512, notification is made to the issuing target information obtaining unit 530 to that effect. On the other hand, in the event that issuing of the link information is not permissible, the other content playing device which is the requester is notified to that effect, and the processing ends.

The issuing target information obtaining unit 530 obtains the device key and device ID unique to the other content playing device which is the requester of issuing the link information. Note that in the event that the content playing device 50 acts proactively to issue link information to other content playing devices, rather than receiving link information issuing requests from other content playing devices, the content playing device 50 is provided with the device key and device ID of the content playing device to which the link information is to be issued. Upon the issuing target information obtaining unit 530 obtaining the device key, notification is made to the restriction information generating unit 528, and the restriction information generating unit 528 is provided with the device key and device ID obtained by the issuing target information obtaining unit 530.

The restriction information generating unit 528 generates a second usage restriction information, based on the usage restriction information stored in the link information storing unit 508. Specifically, the restriction information generating unit 528 obtains, from the usage control unit 512, usage restriction information included in the link information where the local device is set as the link origin, and generates new usage restriction information based on that usage restriction information. For example, the restriction information generating unit 528 sets the expiration date information, hop count information, and link issue limit information, included in the usage restriction information, based on the rules included in the link information. The restriction information generating unit 528 provides the generated usage restriction information to the device key encrypting unit 526.

The device key encrypting unit 526 encrypts the device key of the local device with the device key of the content playing device which is the link information issuing target obtained form the issuing target information obtaining unit 530. The encrypted device key of the local device, the device ID obtained from the issuing target information obtaining unit 530, and the usage restriction information obtained from the restriction information generating unit 528, are provided to the link information issuing unit 524.

The link information issuing unit 524 generates link information including usage restriction information and the device key of the local device, wherein the link origin is the content playing device to which the link information is to be issued, and the link target is the local device, based on the device ID, device key of the local device, and the usage restriction information, obtained from the device key encrypting unit 526. Link information for generating a path from the local device to the user ID of the user using the content providing source device is obtained from the link information storage unit 508, and provided to the content playing device to which the link information is to be issued, along with the newly generated link information.

Upon receiving a link information issuing permissible/non-permissible inquiry from the issuing request accepting unit 532, the usage control unit 512 obtains the link information wherein the local device is set as the link origin, from the link information storing unit 508. Based on the usage restriction information included in the obtained link information, the usage restriction unit 512 determines whether or not issuing of link information is permissible. Specifically, reference is made to the setting values of the expiration date information included in the link information to determine whether the current date is within the expiration date. Also, reference is made to the hop count information and link issue limit information, and determination is made regarding whether or not link information can be issued (i.e., whether the values are other than zero). Also, under request from the restriction information generating unit 528, the usage control unit 512 obtains usage restriction information included in the link information where the local device is set as the link origin from the link information storing unit 508, and provides this to the restriction information generating unit 528. The above has been description of functions related to issuing of link information.

Figure 21:
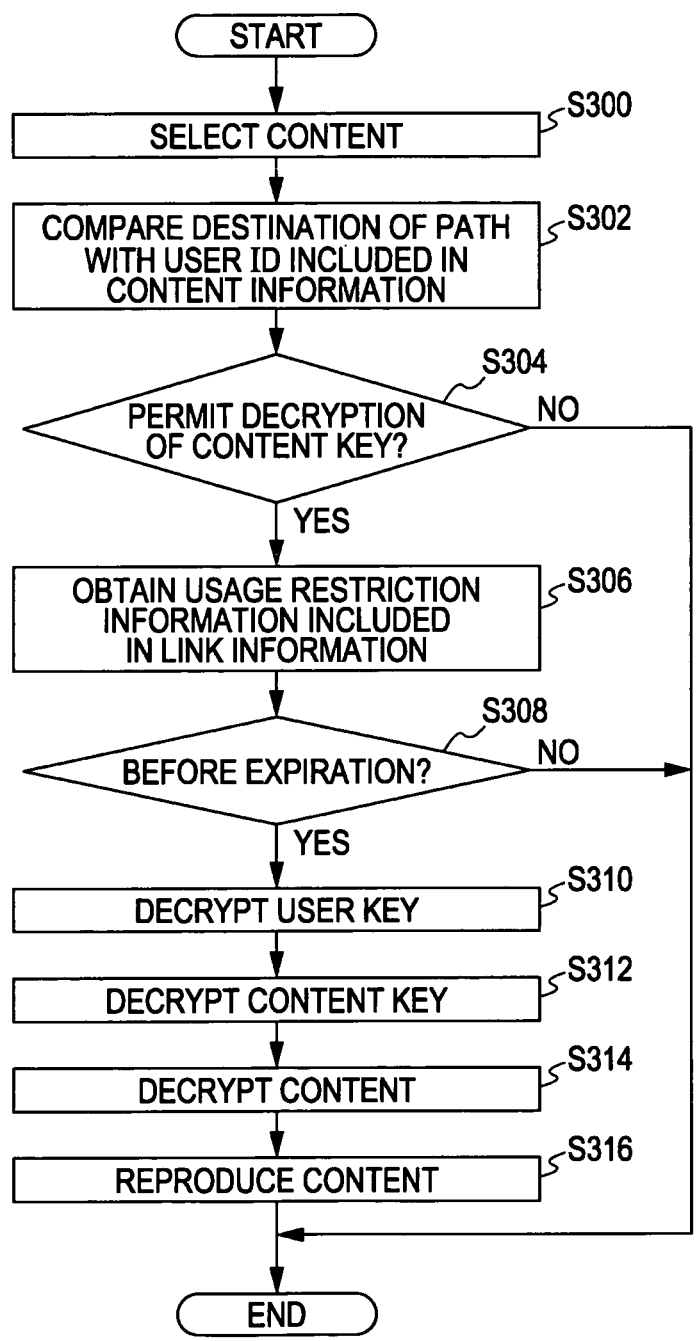
FIG. 21 is a flowchart illustrating content reproducing processing with the content reproducing device according to the embodiment.

The above has been a description of the functional configuration of the content playing device 50. Note that the content playing device 50 may be configured such that all of the above-described functions are provided to a single computer, or the content playing device 50 may be configured such that the functions are dispersed among multiple computers, which collectively function as a single content playing device 50. Next, the flow of content playing processing performed by the content playing device 50 will be described with reference to FIG. 21.

10. Flow of Content Playing Processing

First, the content playing device 50 selects a content to play (S300). More specifically, the content selecting unit 509 specifies the content ID of the content to be played, under input processing performed by the user.

Next, the content playing device 50 compares the user ID and path destination included in the content information (S302). More specifically, the determining unit 510 compares the user ID included in the content information specified in step S302, and the user ID correlated with the local device in the link information storage unit 508.

Next, the content playing device 50 determines whether or not to permit decryption of the content key (S304). More specifically, in the event that the two user IDs which the determining unit 510 has compared in step S302 correspond, decryption of the content key is permitted and the flow proceeds top step S306. On the other hand, in the event that the two user IDs do not correspond, content key decryption is not permitted, and the content playing device 50 ends processing without playing the content.

Next, the content playing device 50 obtains usage restriction information included in the link information (S306). More specifically, the usage control unit 512 obtains the usage control information included in the link information wherein the local device is set as the link origin.

Next, the content playing device 50 determines whether or not the link information within the expiration date (S308). More specifically, the usage control unit 512 determines whether within the expiation date based on the expiration date information included in the usage restriction information obtained in step S306 (S308), and if within the expiration date, the flow proceeds to step S310. On the other hand, if beyond the expiration date, the content playing device 50 ends processing without playing the content.

Next, the content playing device 50 decrypts the user key (S310). More specifically, the key processing unit 514 decrypts the encrypted user key stored in the link information storage unit 508, using the device key of the local device. Note that the key processing unit 514 uses the device key of a content playing device 506 (including a content providing source device) other than the local device stored in the link information storage unit 508, for decrypting of the user key as necessary.

Next, the content playing device 50 decrypts the content key (S312). More specifically, the content key decrypting unit 516 decrypts the encrypted content key included in the content information, using the user key decrypted in step S310.

Next, the content playing device 50 decrypts the content to be played (S314). More specifically, the content playing unit 518 decrypts the encrypted content using the content key decrypted in step S312.

Next, the content playing device 50 plays the content (S316). More specifically, the content playing unit 518 plays the content decrypted in step S314.

Figure 22:
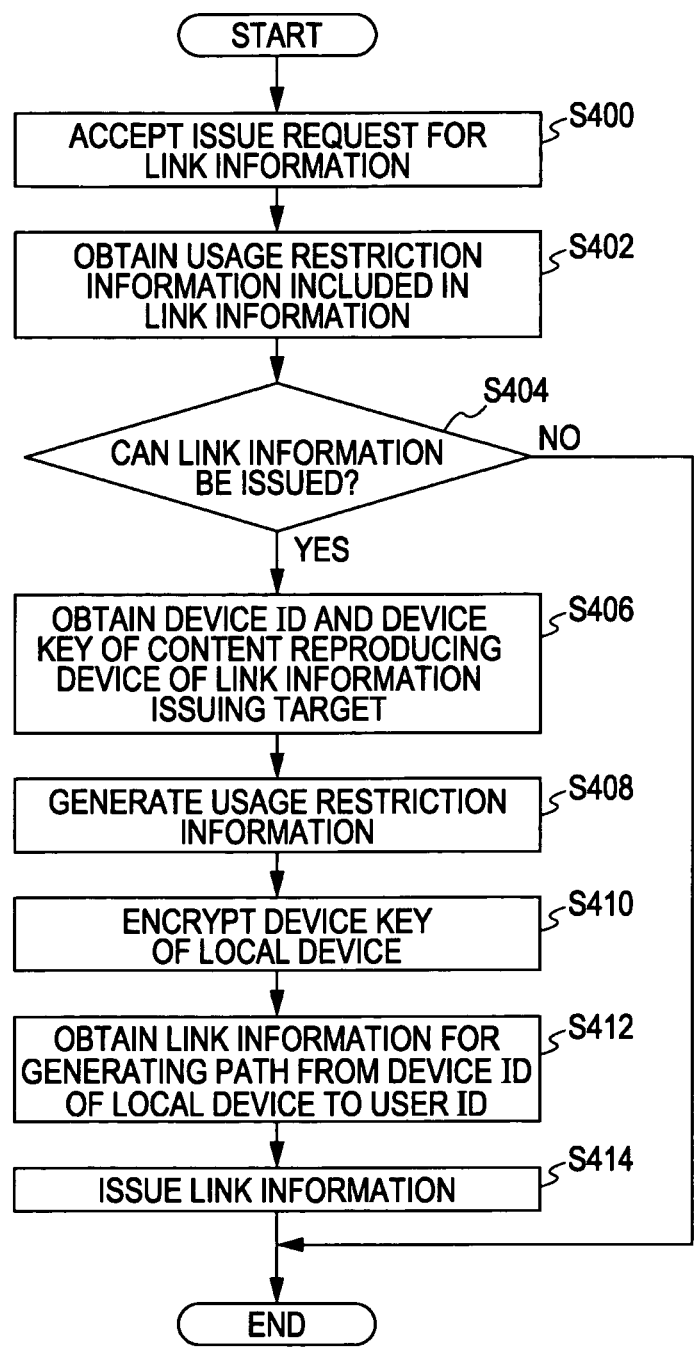
FIG. 22 is a flowchart illustrating link information issuing processing of the content reproducing device according to the embodiment.

The above has been a description regarding the flow of content playing processing which the content playing device 50 performs. Next, the flow of link issuing processing which the content playing device 50 performs will be described with reference to FIG. 22.

11. Flow of Link Issuing Processing

First, the content playing device 50 accepts a link information issuing request from another content playing device (S400). More specifically, the issuing request accepting unit 532 accepts a message requesting issuing of link information from another content playing device, via the communication network.

Next, the content playing device 50 obtains the usage restriction information included in the link information (S402). More specifically, the usage control unit 512 searches link information wherein the device ID of the local device is set as the link origin from the link information storage unit 508, and obtains the usage restriction information included in the link information.

Next, the content playing device 50 determines whether or not link information can be issued (S404). More specifically, the usage control unit 512 determines whether or not link information can be issued, based on the usage restriction information obtained in step S402. FIG. 23 shows the detailed flow of processing performed by the usage control unit 512 in step S404. As shown in FIG. 23, first, the usage control unit 512 makes reference to the expiration date information included in the usage restriction information (S500). The usage control unit 512 compares the current date and time with the expiration date information, and determines whether the current date and time within the expiration date (S502). If within the expiration date, the usage control unit 512 next makes reference to the hop count information (S504) and determines whether or not the value set in the hop count information is 1 or greater S(506). In the event that the value set in the hop count information is 1 or greater, the usage control unit 512 then makes reference to the link issue limit information (S508) and determines whether or not the link issue limit is one or greater (S510). In the event that the link issue limit information is 1 or greater, the usage control unit 512 determines that issuing of link information is permitted and can be carried out. In all other cases, the usage control unit 512 determines that issuing of link information is not permitted and cannot be carried out.

Next, returning to FIG. 22, the content playing device 50 obtains the device ID and device key of the content reproducing device to which the link information is to be issued (S406). More specifically, the issuing target information obtaining unit 530 obtains, from the content reproducing device which is the link information issue requester, the device ID and device key (public key) unique to that content reproducing device.

Next, the content playing device 50 generates usage restriction information to be included in the link information to be issued (S408). More specifically, the restriction information generating unit 528 obtains usage restriction information included in the link information wherein the device ID of the local device is set to the link source, from the link information storage unit 508 via the usage control unit 512, and generates new usage restriction information based on that usage restriction information.

Next, the content playing device 50 encrypts the device key of the local device with the device key of the content playing device to which the link information is to be issued (S410). More specifically, the device key encrypting unit 526 encrypts the device key (secret key) of the local device with the device key (public key) of the content playing device to which the link information is to be issued, obtained by the issuing target information obtaining unit 530 in step S406.

Next, the content playing device 50 obtains link information for generating the path from the device ID of the local device to the user ID of the user of the content providing source device (S412). More specifically, the link information issuing unit 524 obtains link information wherein the link source is the device ID of the local device, link information wherein the link target is the user ID of the user of the content providing source device, and link information of one or a plurality, situated therebetween, from the link information storage unit 508.

Finally, the content playing device 50 issues link information (S414). More specifically, the link information issuing unit 524 generates new link information which generates a path from the content playing device to which the link information is being issued to the local device, including the usage restriction information generated in step S408 and the device key of the local device encrypted in step S410, and provides the content playing device to which the link is being issued with the generated link information and the link information obtained in step S412. The above has been a description of the flow of link information performed by the content playing device.

Accordingly, with the content providing system 500 according to the present embodiment, a content acquirer, who has validly acquired contents from a content providing server can share the acquired contents with other users, while setting the number and extent of users with which sharing can be performed, and the period over which the content can be used, by way of link information, thereby preventing the service provider from being robbed of opportunity of new sales of the content. Also, due to setting usage restrictions in the link information rather that setting usage restrictions in each content, multiple contents (e.g., contents which one acquirer owns) can be subjected to usage restriction in a batch fashion. Also, newly generating usage restriction information at the time of issuing link information allows different usage restrictions to be applied for each content playing device.

Note that the content playing device may be restricted regarding the number of times which is issued link information from an entity other than a copyright management server, in order to protect copyrights and sales opportunities more effectively. In this case, the content playing device may be able to select the content playing device from which it will be issued link information.

While a preferred embodiment of the present invention has been described above with reference to the attached drawings, it is clearly understood that the present invention is by no way restricted to this example. The above-described series of processing may be realized by hardware, or by software. Configuring the function blocks shown in FIGS. 5, 18, and 19 with hardware enables the series of processing to be executed by hard ware. Also, in the event of executing the series of processing with software, a program making up that software is installed into a computer having dedicated hardware built in, or a general-purpose computer or the like which is capable of executing various types of functions by installing programs therein, from a recording medium.

It should be understood by those skilled in the art that various modifications, combinations, sub-combinations and alterations may occur depending on design requirements and other factors insofar as they are within the scope of the appended claims or the equivalents thereof.

What is claimed is:

1. A content providing system comprising:
    a copyright management server configured to perform registration processing of a user and one or more content reproducing devices owned by one or more users, link the one or more users with the one or more content reproducing devices, and link the one or more content reproducing devices with one another, encrypt, and transmit a content key to the one or more content reproducing devices;

a content transmitting device configured to distribute digital contents purchased by one of the one or more users via a network to one of the one or more content reproducing devices; and the one or more content reproducing devices owned by the one or more users, at least one of the one or more content reproducing devices coupled via the network with the copyright management server and the content transmitting device, the one or more content reproducing devices being linked together, the one or more content reproducing devices configured to reproduce the digital contents, the one or more content reproducing devices including at least a laptop, a boom box, a portable device with a headphone set, a set of portable audio players, and at least one or more content reproducing devices being commonly owned by more than one users, the digital contents purchased by a first user of the more than one users being allowed to be used by a second user, who does not purchase the digital contents, among the more than one users, wherein a transmitter of one of the one or more content reproducing devices configured to transmit an encrypted content encrypted by the content key and a receiver of another of the one or more content reproducing devices configured to receive the encrypted content, the transmitter comprising circuitry that:

encrypts a first device key unique to the transmitter with a second device key unique to the receiver, the first device key unique to the transmitter being based on a unique identification number of the transmitter; and generates a path having an origin at the transmitter and a destination at the receiver based on identification information of the transmitter and the receiver, and provides the receiver with link information that represents the path and that identifies the transmitter and receiver as being linked and owned by a same user, the first device key, the content key encrypted with the first device key, content usage restriction information, and hop count information indicating a number of generations the link information can be issued; and the receiver comprising circuitry that:

obtains the content key encrypted with the first device key;

stores the first device key, a usage restriction information to restrict the usage of the first device key, and the link information;

decrypts the content key with the first device key when the stored link information includes information identifying the receiver;

restricts usage of the first device key based on said usage restriction information; and when permitted by the usage restriction information, decrypts and reproduces the encrypted content using the content key.

2. A content reproducing device for decrypting and outputting an encrypted content encrypted by a content key received from a content transmitting device, the content reproducing device comprising:

circuitry that obtains the content key, the content key being encrypted with a first key unique to the content transmitting device and a second key unique to the content reproducing device, the first key being based on a unique identification number of the content transmitting device;

stores the first key, usage restriction information to restrict usage of the first key, link information indicating linking of the content transmitting device and the content receiving device as being linked and owned by a same user, the link information including a path having an origin at the content transmitting device and a destination at the content reproducing device based on identification information of the content transmitting device and the content reproducing device, and hop count information indicating a number of generations the link information can be issued, each issuance of the link information being performed by a different content reproducing device;

decrypts the content key with the first key in the event that the content reproducing device is included in the link information;

restricts usage of the first key based on the usage restriction information; and when permitted by the usage restriction information, decrypts and reproduces the encrypted content using the content key, wherein a copyright management server configured to perform registration processing of a user and one or more content reproducing devices owned by one or more users, link the one or more users with the one or more content reproducing devices, and link the one or more content reproducing devices with one another, encrypt, and transmit the content key to the one or more content reproducing devices;

the content transmitting device configured to distribute digital contents purchased by one of the one or more users via a network to one of the one or more content reproducing devices; and the one or more content reproducing devices owned by the one or more users, at least one of the one or more content reproducing devices coupled via the network with the copyright management server and the content transmitting device, the one or more content reproducing devices being linked together, the one or more content reproducing devices configured to reproduce the digital contents, the one or more content reproducing devices including at least a laptop, a boom box, a portable device with a headphone set, a set of portable audio players, and at least one or more content reproducing devices being commonly owned by more than one users, the digital contents purchased by a first user of the more than one users being allowed to be used by a second user, who does not purchase the digital contents, among the more than one users.

3. The content reproducing device according to claim 2, wherein the circuitry decrypts the first key using the second key;

wherein the circuitry decrypts the first key if-when the link information identifies the content reproducing device and the content transmitting device.

4. The content reproducing device according to claim 2, wherein the usage restriction information includes decryption restriction information which restricts decryption of the content key.

5. The content reproducing device according to claim 2, wherein the usage restriction information includes transmission restriction information that restricts transmission of the first key to another content reproducing device.

6. The content reproducing device according to claim 2, wherein the circuitry further:

issues the link information to another content reproducing device; and encrypts a second key unique to the content transmitting device with a third key unique to the another content reproducing device; and provides the another content reproducing device with the link information for generating a path having an origin at the content reproducing device and a destination at the content transmitting device, a second device key, the usage restriction information, and hop count information indicating a number of generations the link information can be issued unique to the another content reproducing device.

7. The content reproducing device according to claim 6, wherein the circuitry further:

generates a second usage restriction information based on the usage restriction information; and provides the second usage restriction information to the other content reproducing device.

8. A content transmitting device for transmitting an encrypted content encrypted by a content key to a content reproducing device, the content transmitting device comprising:

circuitry that:

encrypts a first device key unique to the content transmitting device with a second device key unique to the content reproducing device, the first device key being based on a unique identification number of the content transmitting device; and provides the content reproducing device with link information for generating a path having an origin at the content transmitting device and a destination at the content reproducing device based on identification information of the content transmitting device and the content reproducing device, the first device key, the content key encrypted with the first device key, content usage restriction information, and hop count information indicating a number of generations the link information can be issued, the link information including an indication that the content transmitting device and the content reproducing device are linked and owned by a same user, wherein the content reproducing device uses the content usage restriction information to determine whether decryption of the encrypted content is permitted, and the content reproducing device decrypts and reproduces the encrypted content using the content key when permitted by the usage restriction information;

a copyright management server configured to perform registration processing of a user and one or more content reproducing devices owned by one or more users, link the one or more users with the one or more content reproducing devices, and link the one or more content reproducing devices with one another, encrypt, and transmit the content key to the one or more content reproducing devices;

the content transmitting device configured to distribute digital contents purchased by one of the one or more users via a network to one of the one or more content reproducing devices; and the one or more content reproducing devices owned by the one or more users, at least one of the one or more content reproducing devices coupled via the network with the copyright management server and the content transmitting device, the one or more content reproducing devices being linked together, the one or more content reproducing devices configured to reproduce the digital contents, the one or more content reproducing devices including at least a laptop, a boom box, a portable device with a headphone set, a set of portable audio players, and at least one or more content reproducing devices being commonly owned by more than one users, the digital contents purchased by a first user of the more than one users being allowed to be used by a second user, who does not purchase the digital contents, among the more than one users.

9. A content reproducing device for decrypting and outputting an encrypted content encrypted by a content key received from a content transmitting device, the content reproducing device comprising:

circuitry that:

obtains the content key encrypted with a first key unique to the content transmitting device and a second key unique to the content reproducing device, the first key being based on a unique identification number of the content transmitting device;

stores the first key, usage restriction information to restrict usage of the first key, link information indicating linking of the content transmitting device and the content reproducing device as being linked and owned by a same user, the link information including a path having an origin at the content transmitting device and a destination at the content reproducing device based on identification information of the content transmitting device and the content reproducing device, and hop count information indicating a number of generations the link information can be issued;

decrypts the content key with the first key in the event that the content reproducing device is included in the link information;

restricts usage of the first key based on the usage restriction information; and when permitted by the usage restriction information, decrypts and reproduces the encrypted content using the content key, wherein a copyright management server configured to perform registration processing of a user and one or more content reproducing devices owned by one or more users, link the one or more users with the one or more content reproducing devices, and link the one or more content reproducing devices with one another, encrypt, and transmit the content key to the one or more content reproducing devices;

the content transmitting device configured to distribute digital contents purchased by one of the one or more users via a network to one of the one or more content reproducing devices; and the one or more content reproducing devices owned by the one or more users, at least one of the one or more content reproducing devices coupled via the network with the copyright management server and the content transmitting device, the one or more content reproducing devices being linked together, the one or more content reproducing devices configured to reproduce the digital contents, the one or more content reproducing devices including at least a laptop, a boom box, a portable device with a headphone set, a set of portable audio players, and at least one or more content reproducing devices being commonly owned by more than one users, the digital contents purchased by a first user of the more than one users being allowed to be used by a second user, who does not purchase the digital contents, among the more than one users.

10. A content transmitting device for transmitting an encrypted content encrypted by a content key to a content reproducing device, the content transmitting device comprising:
circuitry that:
encrypts a first device key unique to the content transmitting device with a second device key unique to the content reproducing device, the first device key being based on a unique identification number of the content transmitting device; and
provides the content reproducing device with link information for generation a path having an origin at the content transmitting device and a destination at the content reproducing device based on identification information of the content transmitting device and the content reproducing device, the first device key, content usage restriction information, and hop count information indicating a number of generations the link information can be issued, the link information including an indication that the content transmitting device and the content reproducing device are linked and owned by a same user,
wherein the content reproducing device uses the content usage restriction information to determine whether decryption of the encrypted content is permitted, and the content reproducing device decrypts and reproduces the encrypted content using the content key when permitted by the usage restriction information;
a copyright management server configured to perform registration processing of a user and one or more content reproducing devices owned by one or more users, link the one or more users with the one or more content reproducing devices, and link the one or more content reproducing devices with one another, encrypt, and transmit the content key to the one or more content reproducing devices;
the content transmitting device configured to distribute digital contents purchased by one of the one or more users via a network to one of the one or more content reproducing devices; and
the one or more content reproducing devices owned by the one or more users, at least one of the one or more content reproducing devices coupled via the network with the copyright management server and the content transmitting device, the one or more content reproducing devices being linked together, the one or more content reproducing devices configured to reproduce the digital contents, the one or more content reproducing devices including at least a laptop, a boom box, a portable device with a headphone set, a set of portable audio players, and
at least one or more content reproducing devices being commonly owned by more than one users, the digital contents purchased by a first user of the more than one users being allowed to be used by a second user, who does not purchase the digital contents, among the more than one users.

11. A non-transitory computer-readable medium encoded with computer-readable instructions that, when executed by a computer, cause the computer to perform a method of decrypting and outputting encrypted content encrypted by a content key received from a content transmitting device, the method comprising:
performing, by a copyright management server, registration processing of a user and one or more content reproducing devices owned by one or more users;
linking the one or more users with the one or more content reproducing devices, and linking the one or more content reproducing devices with one another, encrypting, and transmitting the content key to the one or more content reproducing devices;
distributing, by the content transmitting device, digital contents purchased by one of the one or more users via a network to one of the one or more content reproducing devices, wherein the one or more content reproducing devices owned by the one or more users, at least one of the one or more content reproducing devices being coupled via the network with the copyright management server and the content transmitting device, the one or more content reproducing devices being linked together, the one or more content reproducing devices reproducing the digital contents, the one or more content reproducing devices including at least a laptop, a boom box, a portable device with a headphone set, a set of portable audio players, at least one or more content reproducing devices being commonly owned by more than one users;
allowing the digital contents, which is purchased by a first user of the more than one users, to be used by a second user, who does not purchase the digital contents, among the more than one users;
obtaining the content key encrypted with a first key unique to the content transmitting device and a second key unique to a content reproducing device among the one or more content reproducing devices, the first key being based on a unique identification number of the content transmitting device;
storing the first key, usage restriction information to restrict usage of the first key, link information indicating a linking of the content transmitting device and the content reproducing device as being linked and owned by a same user, the link information including a path having an origin at the content transmitting device and a destination at the content reproducing device based on identification information of the content transmitting device and the content reproducing device, and hop count information indicating a number of generations the link information can be issued;
decrypting the content key with the first key when the content reproducing device is included in the link information;
restricting usage of the first key based on the usage restriction information; and
when permitted by the usage restriction information, decrypting and reproducing the encrypted content using the content key.

12. A non-transitory computer-readable encoded with computer-readable instructions thereon that, when executed by a computer, cause the computer to perform a method of transmitting an encrypted content encrypted by a content key to a content reproducing device, the method comprising:
performing, by a copyright management server, registration processing of a user and one or more content reproducing devices owned by one or more users;
linking the one or more users with the one or more content reproducing devices, and linking the one or more content reproducing devices with one another, encrypting, and transmitting the content key to the one or more content reproducing devices;

distributing, by a content transmitting device, digital contents purchased by one of the one or more users via a network to one of the one or more content reproducing devices, wherein the one or more content reproducing devices owned by the one or more users, at least one of the one or more content reproducing devices being coupled via the network with the copyright management server and the content transmitting device, the one or more content reproducing devices being linked together, the one or more content reproducing devices reproducing the digital contents, the one or more content reproducing devices including at least a laptop, a boom box, a portable device with a headphone set, a set of portable audio players, at least one or more content reproducing devices being commonly owned by more than one users;

allowing the digital contents, which is purchased by a first user of the more than one users, to be used by a second user, who does not purchase the digital contents, among the more than one users;

encrypting a first device key unique to the content transmitting device with a second device key unique to a content reproducing device among the one or more content reproducing devices, the device first key being based on a unique identification number of the content transmitting device; and providing the content reproducing device with link information for generating a path having an origin at the content transmitting device and a destination at the content reproducing device based on identification information of the content transmitting device and the content reproducing device, the first device key, content usage restriction information, and hop count information indicating a number of generations the link information can be issued, the link information including an indication that the content transmitting device and the content reproducing device are linked and owned by a same user, wherein the content reproducing device uses the content usage restriction information to determine whether decryption of the encrypted content is permitted, and the content reproducing device decrypts and reproduces the encrypted content using the content key when permitted by the usage restriction information.

13. A method for decrypting and outputting an encrypted content encrypted by a content key received from a content transmitting device, the method comprising:
performing, by a copyright management server, registration processing of a user and one or more content reproducing devices owned by one or more users;
linking the one or more users with the one or more content reproducing devices, and linking the one or more content reproducing devices with one another, encrypting, and transmitting the content key to the one or more content reproducing devices;
distributing, by a content transmitting device, digital contents purchased by one of the one or more users via a network to one of the one or more content reproducing devices, wherein the one or more content reproducing devices owned by the one or more users, at least one of the one or more content reproducing devices being coupled via the network with the copyright management server and the content transmitting device, the one or more content reproducing devices being linked together, the one or more content reproducing devices reproducing the digital contents, the one or more content reproducing devices including at least a laptop, a boom box, a portable device with a headphone set, a set of portable audio players, at least one or more content reproducing devices being commonly owned by more than one users;
allowing the digital contents, which is purchased by a first user of the more than one users, to be used by a second user, who does not purchase the digital contents, among the more than one users;
obtaining, with circuitry, the content key, the content key being encrypted with a first key unique to the content transmitting device and a second key unique to a content reproducing device among the one or more content reproducing devices, the first key being based on a unique identification number of the content transmitting device;
storing, with the circuitry, the first key, usage restriction information to restrict the usage of the first key, link information indicating linking of the content transmitting device and the content reproducing device as being linked and owned by a same user, the link information including a path having an origin at the content transmitting device and a destination at the content reproducing device based on identification information of the content transmitting device and the content reproducing device, and hop count information indicating a number of generations the link information can be issued;
decrypting, with the circuitry, the content key with the first key when the content reproducing device is included in the link information;
restricting, with the circuitry, usage of the first key based on the usage restriction information; and
when permitted by content usage restriction information, decrypting and reproducing the encrypted content using the content key.

14. A method for transmitting an encrypted content encrypted by a content key to a content reproducing device, the method comprising:
performing, by a copyright management server, registration processing of a user and one or more content reproducing devices owned by one or more users;
linking the one or more users with the one or more content reproducing devices, and linking the one or more content reproducing devices with one another, encrypting, and transmitting the content key to the one or more content reproducing devices;
distributing, by a content transmitting device, digital contents purchased by one of the one or more users via a network to one of the one or more content reproducing devices, wherein the one or more content reproducing devices owned by the one or more users, at least one of the one or more content reproducing devices being coupled via the network with the copyright management server and the content transmitting device, the one or more content reproducing devices being linked together, the one or more content reproducing devices reproducing the digital contents, the one or more content reproducing devices including at least a laptop, a boom box, a portable device with a headphone set, a set of portable audio players, at least one or more content reproducing devices being commonly owned by more than one users;
allowing the digital contents, which is purchased by a first user of the more than one users, to be used by a second user, who does not purchase the digital contents, among the more than one users;

encrypting, with circuitry, a first device key unique to the content transmitting device with a second device key unique to a content reproducing device among the one or more content reproducing devices, the device first key being based on a unique identification number of the content transmitting device; and providing, with the circuitry, the content reproducing device with link information for generating a path having an origin at the content transmitting device and a destination at the content reproducing device based on identification information of the content transmitting device and the content reproducing device, the first device key, content usage restriction information, and hop count information indicating a number of generations the link information can be issued, the link information including an indication that the content transmitting device and the content reproducing device are linked and owned by a same user, wherein the content reproducing device uses the content usage restriction information to determine whether decryption of the encrypted content is permitted, and the content reproducing device decrypts and reproduces the encrypted content using the content key when permitted by the usage restriction information.

* * * * *